United States Patent
Kim et al.

(10) Patent No.: US 12,481,397 B2
(45) Date of Patent: Nov. 25, 2025

(54) ELECTRONIC DEVICE

(71) Applicant: SAMSUNG DISPLAY CO., LTD., Yongin-si (KR)

(72) Inventors: Hyungbae Kim, Yongin-si (KR); Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/740,111

(22) Filed: Jun. 11, 2024

(65) Prior Publication Data

US 2025/0021190 A1 Jan. 16, 2025

(30) Foreign Application Priority Data

Jul. 10, 2023 (KR) .......................... 10-2023-0089375

(51) Int. Cl.
*G06F 3/041* (2006.01)

(52) U.S. Cl.
CPC .......... *G06F 3/0418* (2013.01); *G06F 3/0412* (2013.01); *G06F 2203/04107* (2013.01); *G06F 2203/04111* (2013.01); *G06F 2203/04112* (2013.01)

(58) Field of Classification Search
CPC ................. G06F 3/0418; G06F 3/0412; G06F 2203/04107; G06F 2203/04111; G06F 2203/04112; G06F 3/04164; G06F 3/04182; G06F 3/0443
See application file for complete search history.

(56) References Cited

U.S. PATENT DOCUMENTS

| | | | |
|---|---|---|---|
| 10,969,911 B2 | 4/2021 | Kim et al. | |
| 2017/0115820 A1* | 4/2017 | Zhao | G06F 3/04166 |
| 2017/0168640 A1* | 6/2017 | Yamada | G06F 3/041662 |
| 2018/0157355 A1* | 6/2018 | Kim | G06F 3/0412 |
| 2018/0321793 A1* | 11/2018 | Kim | G06F 3/0446 |
| 2018/0348931 A1* | 12/2018 | Kim | G09G 3/3225 |
| 2019/0114027 A1* | 4/2019 | Tanaka | G06F 3/0416 |
| 2020/0004400 A1* | 1/2020 | Muguruma | G06F 3/04182 |
| 2023/0009064 A1* | 1/2023 | Lee | G06F 3/04184 |
| 2023/0400946 A1* | 12/2023 | Yang | G06F 3/04182 |

FOREIGN PATENT DOCUMENTS

| | | |
|---|---|---|
| JP | 7221618 | 2/2023 |
| KR | 10-2378319 | 3/2022 |
| KR | 10-2431778 | 8/2022 |

* cited by examiner

*Primary Examiner* — Hong Zhou
(74) *Attorney, Agent, or Firm* — F. CHAU & ASSOCIATES, LLC

(57) ABSTRACT

Provided is an electronic device. The electronic device includes a display layer, a sensor layer disposed on the display layer and including a plurality of sensing electrodes, a sensor driving part, a first virtual sensor part including a plurality of virtual electrodes, a first RC circuit electrically connected between the sensor driving part and the first virtual sensor part, and a flexible circuit board which is connected to the display layer and on which the sensor driving part and the first RC circuit are disposed. The sensor driving part may be configured to receive a touch signal from the plurality of sensing electrodes and receive a first noise signal from the plurality of virtual electrodes, the first RC circuit may be configured to control a magnitude of the first noise signal, and the sensor driving part may be configured to subtract the touch signal and the first noise signal.

20 Claims, 19 Drawing Sheets

|  | T1 | T2 | T3 | T4 | T5 |
|---|---|---|---|---|---|
| R7 | 0 | -1 | 0 | -1 | 0 |
| R6 | -1 | 0 | -1 | 0 | -1 |
| R5 | 0 | 14 | 40 | 14 | 0 |
| R4 | -1 | 40 | 99 | 40 | -1 |
| R3 | 0 | 14 | 40 | 14 | 0 |
| R2 | -1 | 0 | -1 | 0 | -1 |
| R1 | 0 | -1 | 0 | -1 | 0 |

FSG, FSa, FSb

FIG. 12D

|  | T1 | T2 | T3 | T4 | T5 |
|---|---|---|---|---|---|
| R7 |  |  |  |  |  |
| R6 |  |  |  |  |  |
| R5 |  |  |  |  |  |
| R4 | 12 | 12 | 12 | 12 | 12 |
| R3 |  |  |  |  |  |
| R2 |  |  |  |  |  |
| R1 |  |  |  |  |  |

DNG1-2, DNS1-2

ELECTRONIC DEVICE

CROSS-REFERENCE TO RELATED APPLICATIONS

This U.S. non-provisional patent application claims priority under 35 U.S.C. § 119 to Korean Patent Application No. 10-2023-0089375, filed on Jul. 10, 2023, in the Korean Intellectual Property Office, the entire contents of which are hereby incorporated by reference.

BACKGROUND

The present disclosure herein relates to an electric device having improved sensing reliability.

Multimedia electronic devices, such as televisions, mobile phones, tablet computers, navigators, game consoles, and the like, include an electronic device for displaying an image. Such an electronic device may include a sensor layer, which is capable of providing a touch-based input manner that allows a user to easily input information or commands intuitively and conveniently in addition to another input manner, such as a button, a keyboard, a mouse, and the like. The sensor layer may sense whether a user's body has touched the electronic device.

SUMMARY

The present disclosure provides an electric device having improved sensing reliability.

An embodiment of the inventive concept provides an electronic device including: a display layer; a sensor layer disposed on the display layer and including a plurality of sensing electrodes; a sensor driving part configured to drive the sensor layer; a first virtual sensor part including a plurality of virtual electrodes; a first RC circuit electrically connected between the sensor driving part and the first virtual sensor part; and a flexible circuit board which is connected to the display layer and on which the sensor driving part and the first RC circuit are disposed, wherein the sensor driving part is configured to receive a touch signal from the plurality of sensing electrodes and receive a first noise signal from the plurality of virtual electrodes, the first RC circuit is configured to control a magnitude of the first noise signal, and the sensor driving part is configured to subtract the touch signal and the first noise signal.

In an embodiment, the plurality of virtual electrodes may include a first virtual electrode and a second virtual electrode, wherein the first virtual electrode and the second virtual electrode may be disposed on layers different from each other, and the first virtual electrode and the second virtual electrode may be disposed on the flexible circuit board.

In an embodiment, the electronic device may further include a second RC circuit electrically connected between the sensor driving part and the first virtual sensor part.

In an embodiment, each of the first RC circuit and the second RC circuit may include a passive element.

In an embodiment, each of the first RC circuit and the second RC circuit may include an active element, and the electronic device may further include a circuit controller configured to control the first RC circuit and the second RC circuit, wherein the circuit controller is disposed on the flexible circuit board.

In an embodiment, the sensor driving part may include a signal receiver including a first input terminal and a second input terminal, wherein the touch signal may be applied to the first input terminal of the signal receiver, and the first noise signal may be applied to the second input terminal of the signal receiver.

In an embodiment, the sensor driving part may include a first signal receiver and a second signal receiver, wherein the first signal receiver and the second signal receiver each includes a first input terminal and a second input terminal, respectively, wherein the touch signal may be applied to the first input terminal of the first signal receiver, and the first noise signal may be applied to the first input terminal of the second signal receiver.

In an embodiment, the plurality of sensing electrodes may include a plurality of first sensing electrodes and a plurality of second sensing electrodes, which are insulated from and intersect the plurality of first sensing electrodes, each of the plurality of first sensing electrodes may extend in a first direction, each of the plurality of second sensing electrodes may extend in a second direction intersecting the first direction, the plurality of first sensing electrodes and the plurality of second sensing electrodes may be configured to define a plurality of channels, respectively, the first noise signal may include a plurality of noise values, which correspond to the plurality of channels, respectively, and the sensor driving part may be configured to digital-convert the plurality of noise values into a plurality of digital noise signals, respectively.

In an embodiment, the sensor driving part may be configured to subtract a mean value of the plurality of digital noise signals from the digital signal of the touch signal.

In an embodiment, the sensor driving part may be configured to subtract a mean value of digital noise signals arranged in the first direction among the plurality of digital noise signals from the digital signal of the touch signal.

In an embodiment, the sensor driving part may be configured to subtract a mean value of digital noise signals arranged in the second direction among the plurality of digital noise signals from the digital signal of the touch signal.

In an embodiment, the touch signal may be provided in plurality, the plurality of touch signals may correspond to the plurality of channels, respectively, the sensor driving part may be configured to subtract the plurality of digital noise signals from the digital signals of the plurality of touch signals, respectively.

An embodiment of the inventive concept provides an electronic device including: a display layer; a sensor layer disposed on the display layer and comprising a plurality of sensing electrodes; a sensor driving part configured to drive the sensor layer; a first virtual sensor part comprising a plurality of virtual electrodes; a first RC circuit electrically connected between the sensor driving part and the first virtual sensor part; and a flexible circuit board which is connected to the display layer and on which the sensor driving part and the first RC circuit are disposed, wherein the sensor driving part is configured to receive a touch signal from the plurality of sensing electrodes and receive a first noise signal from the plurality of virtual electrodes, the first RC circuit is configured to control a magnitude of the first noise signal, and the sensor driving part is configured to subtract the touch signal and the first noise signal, wherein the sensor layer comprises an active area and a peripheral area disposed around the active area, the sensor layer is driven in a unit of a sensing frame, wherein the sensing frame comprises a first section, a second section, and a third section, and the sensor driving part is configured to receive the touch signal in a self-touch method in each of the first section and the second section and receive the touch signal in a mutual touch method in the third section.

In an embodiment, the first RC circuit may be configured to operate in the unit of the sensing frame and include a passive element, the first RC circuit may be configured to control a magnitude of the first noise signal in a first-1 sampling section corresponding to the first section during the sensing frame, the first RC circuit may be configured to control a magnitude the first noise signal in a first-2 sampling section corresponding to the second section during the sensing frame, and the first RC circuit may be configured to control a magnitude the first noise signal in a first-3 sampling section corresponding to the third section during the sensing frame.

In an embodiment, the first-1 sampling section may be less than the first section, the first-2 sampling section may be less than the second section, and the first-3 sampling section may be less than the third section.

In an embodiment, the active area may include a first area, a second area, and a third area, which are arranged in a second direction, the third section may include a third-1 section, in which a signal corresponding to the first area is received, a third-2 section, in which a signal corresponding to the second area is received, and a third-3 section, in which a signal corresponding to the third area is received, the first RC circuit may be configured to operate in the unit of the sensing frame and include an active element, the first RC circuit may be configured to control a magnitude of the first noise signal in a second-1 sampling section corresponding to the third-1 section during the sensing frame, the first RC circuit may be configured to control a magnitude the first noise signal in a second-2 sampling section corresponding to the third-2 section during the sensing frame, and the first RC circuit may be configured to control a magnitude the first noise signal in a second-3 sampling section corresponding to the third-3 section during the sensing frame.

In an embodiment, the electronic device may further include a second virtual sensor part disposed on the flexible circuit board, wherein the sensor driving part may be configured to receive a second noise signal from the second virtual sensor part, and the sensor driving part may be configured to subtract the first noise signal and the second noise signal from the touch signal.

An embodiment of the inventive concept provides an electronic device including: a display layer; a sensor layer disposed on the display layer and comprising a plurality of sensing electrodes; a sensor driving part configured to drive the sensor layer; a first virtual sensor part comprising a plurality of virtual electrodes; a first RC circuit electrically connected between the sensor driving part and the first virtual sensor part; and a flexible circuit board which is connected to the display layer and on which the sensor driving part and the first RC circuit are disposed, wherein the sensor driving part is configured to receive a touch signal from the plurality of sensing electrodes and receive a first noise signal from the plurality of virtual electrodes, the first RC circuit is configured to control a magnitude of the first noise signal, and the sensor driving part is configured to subtract the touch signal and the first noise signal, wherein the sensor layer comprises an active area and a peripheral area disposed around the active area, and the first virtual sensor part is disposed on the peripheral area.

In an embodiment, the electronic device may further include an RC line configured to control a magnitude of the first noise signal and disposed on the sensor layer, wherein the RC line may be connected between the sensor driving part and the virtual sensor part.

In an embodiment, the sensor layer may include an active area and a peripheral area disposed around the active area, and the RC line may be disposed on the peripheral area.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept.

In the drawings:

Figures 12A, 12B:
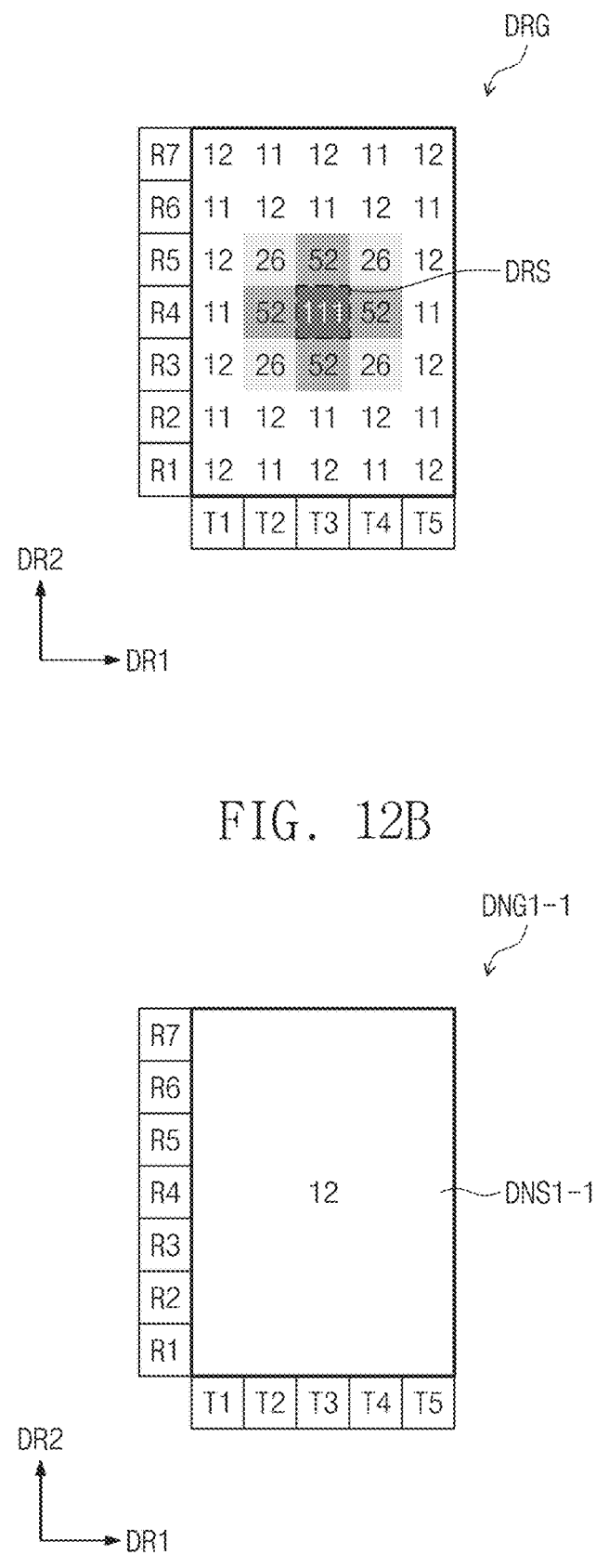

FIGS. 12A to 12F are views for explaining a digital touch signal, a digital noise signal, and a reduction signal according to an embodiment of the inventive concept;

DETAILED DESCRIPTION

Figure 1:
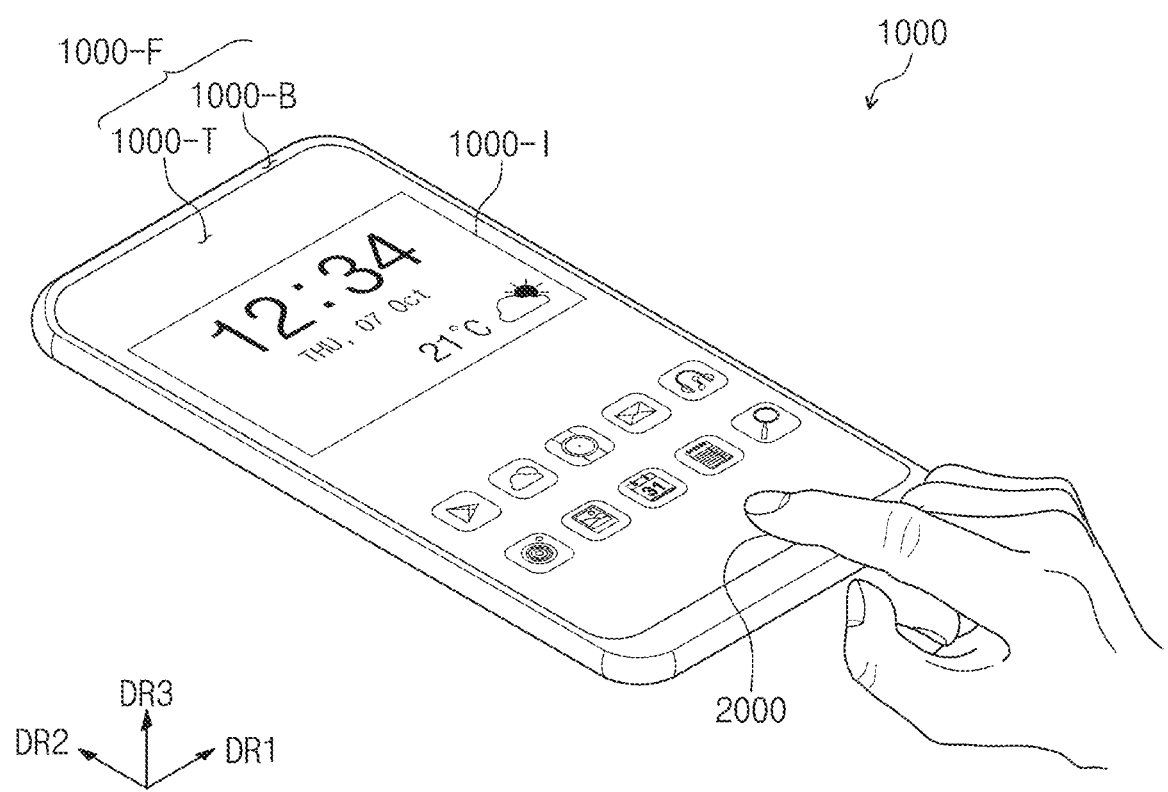
FIG. 1 is a perspective view of an electronic device according to an embodiment of the inventive concept.

In this specification, it will also be understood that when one component (or area, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration. The term "and/or" includes any and all combinations of one or more of the associated elements.

It will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims. The terms of a singular form may include plural forms unless referred to the contrary.

Also, "under", "below", "above", "upper", and the like are used for explaining relation association of the elements illustrated in the drawings. The terms may be a relative concept and described based on directions expressed in the drawings.

The meaning of 'include' or 'comprise' specifies a property, a fixed number, a process, an operation, an element, a component or a combination thereof, but does not exclude other properties, fixed numbers, processes, operations, elements, components or combinations thereof.

Unless otherwise defined, all terms (including technical and scientific terms) used herein have the same meaning as commonly understood by a person of ordinary skill in the art to which the inventive concept belongs. In addition, terms, such as terms defined in commonly used dictionaries, should be interpreted as having a meaning consistent with the meaning in the context of the related technology, and unless explicitly defined here.

Hereinafter, embodiments of the inventive concept will be described with reference to the accompanying drawings.

FIG. 1 is a perspective view of an electronic device according to an embodiment of the inventive concept;

Referring to FIG. 1, an electronic device 1000 may be a device that is activated according to an electrical signal. The electronic device 1000 may include various embodiments. For example, an electronic device 1000 may be used for large electronic devices, such as a television, a monitor, or an external billboard, as well as small and middle electronic devices, such as a personal computer, a notebook computer, a personal digital terminal, a car navigation unit, a game console, a portable electronic device, and a camera. In addition, these are only proposed as examples, and electronic device 1000 may also be employed in other electronic devices without departing from the concept of the inventive concept. The electronic device 1000 including a smart phone will be described for simplicity and clarity, as a non-limiting example.

In various embodiments, the electronic device 1000 may have a display surface 1000-F parallel to the planed defined by each of a first direction DR1 and a second direction DR2 intersecting the first direction DR1. The display surface 1000-F may include a display area 1000-T and a non-display area 1000-B.

In various embodiments, an image 1000-I may be displayed on the display area 1000-T, and viewed from a third direction DR3. The third direction DR3 may be a thickness direction. The image 1000-I may include a still image, as well as a dynamic image. In FIG. 1, the image 1000-I is shown as a watch and an icon, as an example. The display surface on which the image 1000-I is displayed may correspond to a front surface of the electronic device 1000.

In various embodiments, a front surface (or a top surface) or a rear surface (or a bottom surface) of each of the component members may be defined based on a direction in which the image 1000-I is displayed. The front and rear surfaces may face each other in a third direction DR3 with a thickness therebetween. A normal direction of each of the front and rear surfaces may be parallel to the third direction DR3. In this specification, the term "on the plane" may mean when viewed in the third direction DR3.

The image 1000-I may not be displayed on the non-display area 1000-B.

In various embodiments, the electronic device 1000 according to an embodiment of the inventive concept may sense a user's input applied from the outside the electronic device 1000. For example, the electronic device 1000 may sense a user's body 2000 applied from the outside. The user's inputs may include various types of external inputs such as a portion of the user's body, light, heat, or a pressure. The electronic device 1000 may also sense an input applied to a side or rear surface of the electronic device 1000, according to a structure of the electronic device 1000.

Figure 2:
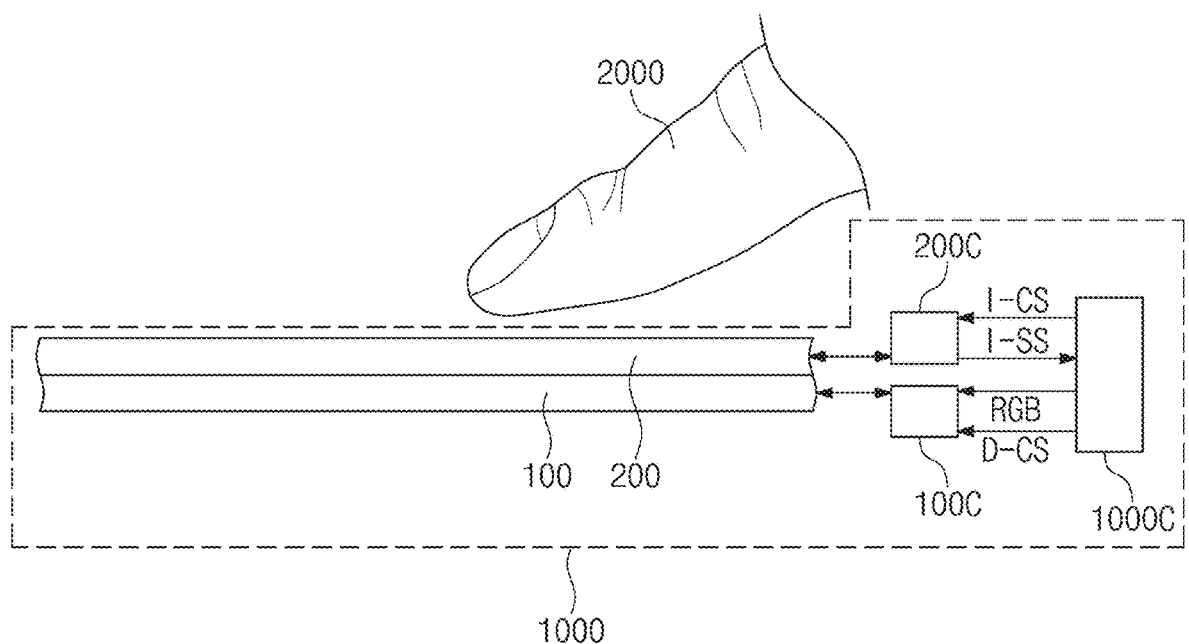
FIG. 2 is a schematic block diagram of the electronic device according to an embodiment of the inventive concept.

FIG. 2 is a schematic block diagram of the electronic device according to an embodiment of the inventive concept.

Referring to FIG. 2, the electronic device 1000 may include a display layer 100, a sensor layer 200, a display driving part 100C, a sensor driving part 200C, and a controller 1000C.

In various embodiments, the display layer 100 may be configured to substantially generate an image. The display layer 100 may be an emission-type display layer, but is not limited thereto, where for example, the display layer 100 may be an organic light emitting display layer, a quantum dot display layer, a micro LED display layer, or a nano LED display layer. An emission layer of the organic light emitting display layer may include an organic light emitting material. An emission layer of the quantum dot light emitting display layer may include a quantum dot, a quantum rod, and the like. An emission layer of the micro-LED display layer may include a micro LED. An emission layer of the nano-LED display layer may include a nano LED.

In various embodiments, the sensor layer 200 may be disposed on the display layer 100, where the sensor layer 200 may cover the display layer 100. The sensor layer 200 may sense an external input applied from the outside. The sensor layer 200 may detect an external input by the user's body 2000.

In various embodiments, the controller 1000C may control an overall operation of the electronic device 1000, where for example, the controller 1000C may control operations of the display driving part 100C and the sensor driving part 200C. The controller 1000C may include at least one microprocessor, and the controller 1000C may be referred to as a host.

In various embodiments, the display driving part 100C may control the display layer 100. The controller 1000C may further include a graphic controller, where the graphic controller may be integral with the controller 1000C. The display driving part 100C may receive image data RGB and a control signal D-CS from the controller 1000C. The control signal D-CS may include various signals, where for example, the control signal D-CS may include an input vertical synchronization signal, an input horizontal synchronization signal, a main clock signal, and a data enable signal.

In various embodiments, the display driving part 100C may generate a vertical synchronization signal and a horizontal synchronization signal for controlling timing of providing a signal to the display layer 100 based on the control signal D-CS.

In various embodiments, the sensor driving part 200C may control the sensor layer 200. The sensor driving part 200C may receive a control signal I-CS from the controller 1000C. The control signal I-CS may include a clock signal.

In various embodiments, the sensor driving part 200C may calculate external input coordinate information based on the signal received from the sensor layer 200 and provide a coordinate signal I-SS having the coordinate information to the controller 1000C. The controller 1000C may execute an operation corresponding to the user input based on the coordinate signal I-SS. For example, the controller 1000C may operate the display driving part 100C to display a new application image on the display layer 100 based on the coordinate signal I-SS.

Figure 3A:
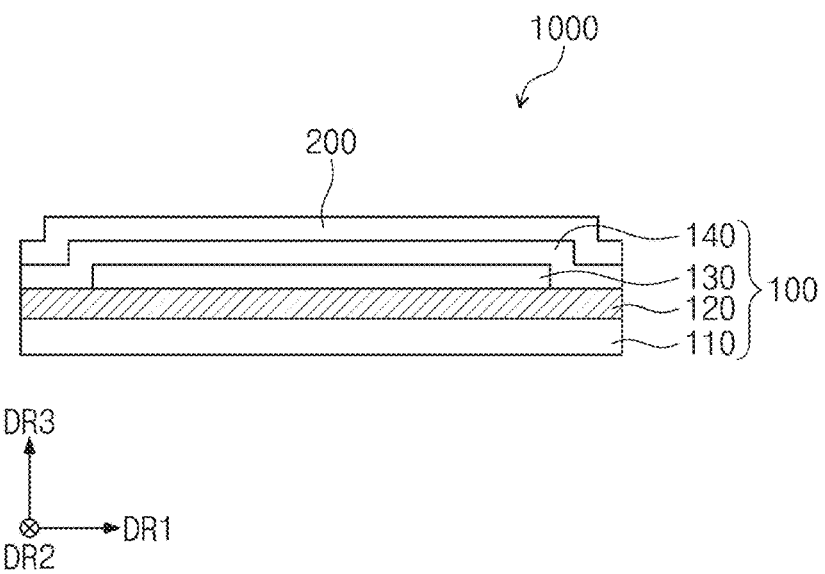
FIG. 3A is a cross-sectional view of the electronic device according to an embodiment of the inventive concept.

FIG. 3A is a cross-sectional view of the electronic device according to an embodiment of the inventive concept.

Referring to FIG. 3A, the electronic device 1000 may include a display layer 100 and a sensor layer 200. The display layer 100 may include a base layer 110, a circuit layer 120, a light emitting element layer 130, and an encapsulation layer 140, where the base layer 110, circuit layer 120, light emitting element layer 130, and encapsulation layer 140 may be sequentially stacked.

In various embodiments, the base layer 110 may be a member that provides a surface on which a circuit layer 120 is disposed. The base layer 110 may be a glass substrate, a metal substrate, or a polymer substrate. However, the embodiment of the inventive concept is not limited thereto. For example, the base layer 110 may be an inorganic layer, an organic layer, or a composite layer.

In various embodiments, the base layer 110 may have a multilayered structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

In various embodiments, each of the first and second synthetic resin layers may include a polyimide-based resin. Each of the first and second synthetic resin layers may include at least one of an acrylate-based resin, a methacrylate-based resin, a polyisoprene-based resin, a vinyl-based resin, an epoxy-based resin, an urethane-based resin, a cellulose-based resin, a siloxane-based resin, a polyamide-based resin, or a perylene-based resin. In this specification, the "~~"-based resin means as including a functional group of "~~".

In various embodiments, the circuit layer 120 may be disposed on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating or vapor deposition, and the insulating layer, the semiconductor layer, and the conductive layer may be selectively patterned through a plurality of photolithography processes. Thereafter, the semiconductor pattern, the conductive pattern, and the signal line included in the circuit layer 120 may be provided.

In various embodiments, a light emitting element layer 130 may be disposed on the circuit layer 120. The light emitting element layer 130 may include a light emitting element, where for example, the light emitting element layer 130 may include an organic light emitting material, quantum dots, quantum rods, a micro LED, or a nano LED.

In various embodiments, an encapsulation layer 140 may be disposed on the light emitting element layer 130. The encapsulation layer 140 may protect the display element layer 130 against foreign substances such as moisture, oxygen, and dust particles.

In various embodiments, the sensor layer 200 may be disposed on the display layer 100 through a continuous process. The sensor layer 200 may be directly disposed on the display layer 100, where the direct disposition indicates that a third component is not disposed between the sensor layer 200 and the display layer 100. A separate adhesive member may not be disposed between the sensor layer 200 and the display layer 100, where the sensor layer 200 is directly disposed on the display layer 100. Alternatively, the sensor layer 200 may be bonded to the display layer 100 through an adhesive member, where the adhesive member may include a common adhesive or an adhesive agent.

Figure 3B:
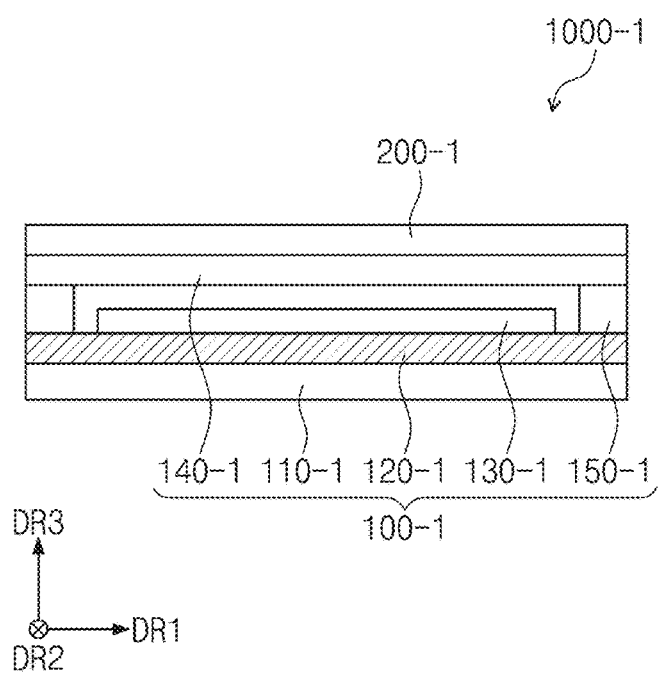
FIG. 3B is a cross-sectional view of an electronic device according to an embodiment of the inventive concept.

FIG. 3B is a cross-sectional view of an electronic device according to an embodiment of the inventive concept.

Referring to FIG. 3B, an electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

In various embodiments, each of the base substrate 110-1 and the encapsulation substrate 140-1 may be a glass substrate, a metal substrate, or a polymer substrate, but is not particularly limited thereto.

In various embodiments, the coupling member 150-1 may be disposed between the base substrate 110-1 and the encapsulation substrate 140-1, where the coupling member 150-1 may be between the circuit layer 120-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photocurable resin or a photo-plastic resin; however, the material forming the coupling member 150-1 is not limited thereto.

In various embodiments, the sensor layer 200-1 may be directly disposed on the encapsulation substrate 140-1. The direct disposition indicates that a third component is not disposed between the sensor layer 200-1 and the encapsulation substrate 140-1. A separate adhesive member may not be disposed between the sensor layer 200-1 and the display layer 100-1; however, the embodiment of the inventive concept is not limited thereto. For example, an adhesive layer may be further disposed between the sensor layer 200-1 and the encapsulation substrate 140-1.

Figure 4:
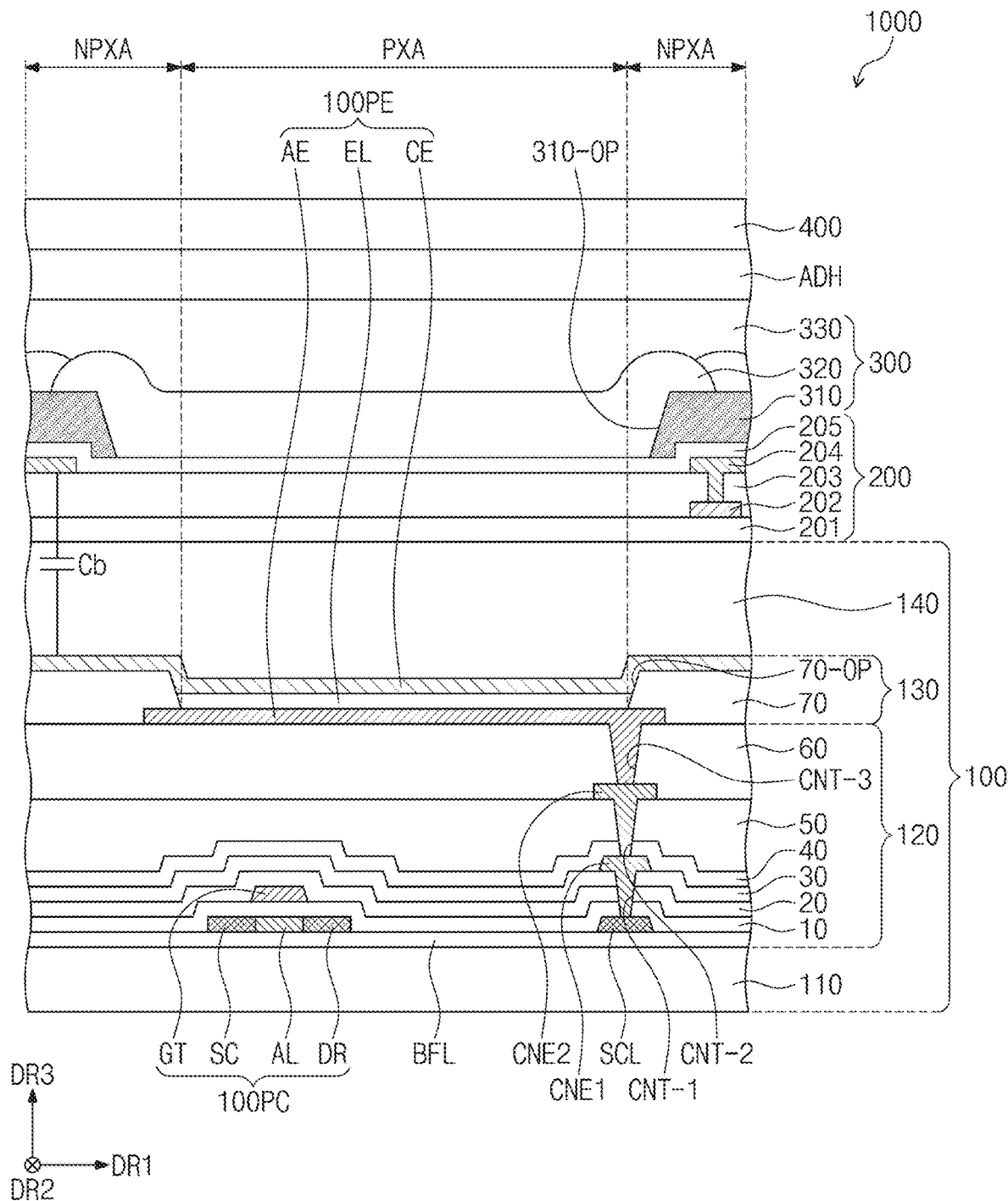
FIG. 4 is a cross-sectional view of a display module according to an embodiment of the inventive concept.

FIG. 4 is a cross-sectional view of a display module according to an embodiment of the inventive concept. In description in FIG. 4, the same reference numerals are used for the components described in FIG. 3A, and descriptions thereof are omitted.

Referring to FIG. 4, the electronic device 1000 may include a display layer 100, a sensor layer 200, an antireflection layer 300, an adhesive layer ADH, and a window 400. The display layer 100, sensor layer 200, antireflection layer 300, adhesive layer ADH, and window 400 may be sequentially stacked.

In various embodiments, at least one inorganic layer may be disposed on a top surface of the base layer 110. The inorganic layer may include at least one of oxide, titanium oxide, silicon oxide, silicon nitride, silicon oxynitride, zirconium oxide, or hafnium oxide. The inorganic layer may be provided as a multilayer, where the multilayered inorganic layer may constitute a barrier layer and/or a buffer layer.

In various embodiments, the display layer 100 may include a buffer layer BFL, where the buffer layer BFL may improve a bonding force between the base layer 110 and the semiconductor pattern. The buffer layer BFL may include at least one of silicon oxide, silicon nitride, or silicon oxynitride. For example, the buffer layer BFL may include a structure in which the silicon oxide layer and the silicon nitride layer are alternately laminated.

In various embodiments, the semiconductor pattern may be disposed on the buffer layer BFL. The semiconductor pattern may correspond to one of a plurality of patterns of the semiconductor layer disposed on the buffer layer BFL. The semiconductor pattern may include a metal oxide. In an embodiment, the semiconductor pattern may include polysilicon. However, the embodiment of the inventive concept is not limited thereto, and the semiconductor pattern may include amorphous silicon, low-temperature polycrystalline silicon, or an oxide semiconductor.

In various embodiments, the metal oxide semiconductor may include a crystalline or amorphous oxide semiconductor. For example, the oxide semiconductor may include a metal oxide, such as zinc (Zn), indium (In), gallium (Ga), tin (Sn), titanium (Ti), or metals, such as zinc (Zn), indium (In), gallium (Ga), tin (Sn), and a mixture of their oxide. The oxide semiconductor may include indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO), and the like.

In various embodiments, the semiconductor pattern may include a plurality of regions classified according to whether the metal oxide is reduced. A region in which the metal oxide is reduced (hereinafter, referred to as a reduction region) has a conductivity higher than that of a region in which the metal oxide is not reduced (hereinafter, referred to as a non-reduction region). The reduction region may act as a source/drain of a transistor or a signal line. The non-reduction region may act as a semiconductor region (or channel) of the transistor. In other words, a portion of the semiconductor pattern may be a semiconductor region of the transistor, another portion may be a source/drain region of the transistor, and further another portion may be a signal transfer region.

In various embodiments, each of the pixels may have an equivalent circuit including five transistors, two capacitors, and a light emitting element, and an equivalent circuit diagram of the pixel may be modified in various forms. In FIG. 4, one transistor 100PC and a light emitting element 100PE provided in the pixel are illustrated as an example.

In various embodiments, a source region SC, an active region AL, and a drain region DR of the transistor 100PC may be provided from the semiconductor pattern. The source region SC and the drain region DR may extend in opposite directions from the active region AL on a cross section.

FIG. 4 illustrates a portion of a connection signal line SCL formed from the semiconductor pattern. Although not particularly shown, the connection signal line SCL may be connected to the drain region DR of the transistor 100PC on the plane.

In various embodiments, a first insulating layer 10 may be disposed on the buffer layer BFL. The first insulating layer 10 may overlap the plurality pixels PX to cover the semiconductor pattern. The first insulating layer 10 may include an inorganic layer and/or an organic layer and may have a single-layered or multilayered structure. The first insulating layer 10 may include at least one of aluminum oxide, titanium oxide, silicon oxide, silicon nitride, silicon oxynitride, zirconium oxide, or hafnium oxide. In various embodiments, the first insulating layer 10 may include a single-layered silicon oxide layer. The insulating layer of the circuit layer 120, which will be described later, as well as the first insulating layer 10 may be an inorganic layer and/or an organic layer and may have a single-layered or a multilayered structure. The inorganic layer may include at least one of the above-described materials, but is not limited thereto.

In various embodiments, a gate GT of the transistor 100PC may be disposed on the first insulating layer 10, where the first insulating layer 10 can separate the gate GT from the active region AL. The gate GT can overlap the active region AL. The gate GT may be a portion of a metal pattern. In the process of doping the semiconductor pattern, the gate GT may function as a mask.

In various embodiments, the second insulating layer 20 may be disposed on the first insulating layer 10 and cover the gate GT. A second insulating layer 20 may overlap the pixels. The second insulating layer 20 may be an inorganic layer and/or an organic layer, and may have a single-layered or multilayered structure. The second insulating layer 20 may include at least one of silicon oxide, silicon nitride, or silicon oxynitride. In various embodiments, the second insulating layer 20 may have a multilayer structure including a silicon oxide layer and a silicon nitride layer.

In various embodiments, a third insulating layer 30 may be disposed on the second insulating layer 20, where the third insulating layer 30 can cover the second insulating layer 20. The third insulating layer 30 may be a single layer or multilayer structure. For example, the third insulating layer 30 may have a multilayer structure including a silicon oxide layer and a silicon nitride layer.

In various embodiments, a first connection electrode CNE1 may be disposed on the third insulating layer 30, where the first connection electrode CNE1 may be electrically connected to the connection signal line SCL through a contact hole CNT-1 passing through the first to third insulating layers 10 to 30.

In various embodiments, a fourth insulating layer 40 may be disposed on the third insulating layer 30, where the fourth insulating layer 40 may cover at least a portion of the first connection electrode CNE1. The fourth insulating layer 40 may be a single-layered silicon oxide layer. A fifth insulating layer 50 may be disposed on the fourth insulating layer 40, where the fifth insulating layer 50 may cover the fourth insulating layer 40. The fifth insulating layer 50 may be an organic layer.

In various embodiments, a second connection electrode CNE2 may be disposed on the fifth insulating layer 50, where the second connection electrode CNE2 may be electrically connected to the first connection electrode CNE1 through a contact hole CNT-2 passing through the fourth insulating layer 40 and the fifth insulating layer 50.

In various embodiments, a sixth insulating layer 60 may be disposed on the fifth insulating layer 50, where the sixth insulating layer 60 may cover at least a portion of the second connection electrode CNE2. The sixth insulating layer 60 may be an organic layer.

In various embodiments, a light emitting element layer 130 may be disposed on the circuit layer 120, where the light emitting element layer 130 may include a light emitting element 100PE and a pixel defining layer 70. For example, the light emitting element layer 130 may include an organic light emitting material, an inorganic light emitting material, an organic-inorganic light emitting material, a quantum dot, a quantum rod, a micro LED, or a nano LED. Hereinafter, the light emitting element 100PE is described as an example of an organic light emitting element, but is not limited thereto.

In various embodiments, the light emitting element 100PE may include a first electrode AE, an emission layer EL, and a second electrode CE.

In various embodiments, the first electrode AE may be disposed on the sixth insulating layer 60. The first electrode AE may be electrically connected to the second connection electrode CNE2 through a contact hole CNT-3 passing through the sixth insulating layer 60.

In various embodiments, a pixel defining layer 70 may be disposed on the sixth insulating layer 60 and cover a portion of the first electrode AE. An opening 70-OP is defined in the pixel defining layer 70, where the opening 70-OP of the pixel defining layer 70 exposes at least a portion of the first electrode AE.

In various embodiments, the display area 1000-T (see FIG. 1) may include an emission area PXA and a non-emission area NPXA adjacent to the emission area PXA, where a non-emission area NPXA may be on opposite sides of the emission area PXA. A non-emission area NPXA may surround the emission area PXA. In various embodiments, an emission area PXA may correspond to a portion of an area of the first electrode AE, which is exposed by the opening 70-OP.

In various embodiments, the emission layer EL may be disposed on the first electrode AE, where the emission layer EL may be disposed on an area corresponding to the opening 70-OP. The emission layer EL may be separated into each of the pixels. The emission layers EL may emit light having at least one of a blue, red, or green color; however, the embodiments of the inventive concept are not limited thereto. For example, the emission layer EL may be commonly provided to be connected to the pixels, where the emission layer EL may provide blue light or white light.

The second electrode CE may be disposed on the emission layer EL. The second electrode CE may have an integrated shape and may be commonly disposed on the plurality of pixels.

In various embodiments, a hole control layer may be disposed between the first electrode AE and the emission layer EL. The hole control layer may be disposed on the emission area PXA and the non-emission area NPXA. The hole control layer may include a hole transport layer and may further include a hole injection layer. An electron control layer may be disposed between the emission layer EL and the second electrode CE. The electron control layer may include an electron transport layer and may further include an electron injection layer. The hole control layer and the electron control layer may be provided in the pixels by using an open mask or inkjet process.

In various embodiments, an encapsulation layer 140 may be disposed on the light emitting element layer 130. The encapsulation layer 140 may include an inorganic layer, an organic layers, and an inorganic layer, which are sequentially stacked, but layers constituting the encapsulation layer 140 are not limited thereto. The inorganic layers may protect the light emitting element layer 130 against moisture and oxygen, and the organic layer may protect the light emitting element layer 130 against foreign substances, such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the embodiment of the inventive concept is not limited thereto.

In various embodiments, the sensor layer 200 may include a base layer 201, a first conductive layer 202, a sensing insulating layer 203, a second conductive layer 204, and a cover insulating layer 205.

In various embodiments, the base layer 201 may have a single-layered structure or a multilayered structure in which a plurality of layers are stacked in the third direction DR3.

In various embodiments, the first conductive layer 202 and the second conductive layer 204 may each have a single-layered structure or a multilayered structure in which a plurality of layers are stacked in the third directional axis DR3.

In various embodiments, the first conductive layer 202 having the single-layered structure may include a metal layer or a transparent conductive layer. The metal layer may include molybdenum, silver, titanium, copper, aluminum, or an alloy thereof. The transparent conductive layer may include a transparent conductive oxide, such as indium-tin oxide (ITO), indium-zinc oxide (IZnO), zinc oxide (ZnO), or indium-zinc-tin oxide (IZTO). In addition, the transparent conductive layer may include conductive polymers such as poly(3,4-ethylenedioxythiophene) (PEDOT), metal nanowires, graphene, and the like.

In various embodiments, the conductive layer having the multilayered structure may include metal layers. The metal layers may have a three-layered structure of titanium/aluminum/titanium. The conductive layer having the multilayered structure may include at least one metal layer and at least one transparent conductive layer.

In various embodiments, the sensing insulating layer 203 and/or the cover insulating layer 205 may include an inorganic layer. The inorganic layer may include at least one of oxide, titanium oxide, silicon oxide, silicon nitride, silicon oxynitride, zirconium oxide, or hafnium oxide.

In various embodiments, the sensing insulating layer 203 and/or the cover insulating layer 205 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

In various embodiments, a parasitic capacitor Cb may be disposed between the sensor layer 200 and the second electrode CE. The parasitic capacitor Cb may also be referred to as a base capacitance. As a distance between the sensor layer 200 and the second electrode CE becomes closer, a value (e.g., Farads) of the parasitic capacitor Cb may increase. As the capacitance of the parasitic capacitor Cb increases, a ratio of a capacitance change to a reference value may decrease. The change in capacitance may mean a change in capacitance that occurs before and after an input by an input unit, for example, the user's body 2000 (see FIG. 2).

In various embodiments, the sensor driving part 200C (see FIG. 2) processing the signal sensed by the sensor layer 200 may perform a leveling operation to remove a value corresponding to the capacitance of the parasitic capacitor Cb from the sensed signal. The ratio of change in amount of capacitance to the reference value may increase to sensing sensitivity by the leveling operation.

In various embodiments, the antireflection layer 300 may be disposed on the sensor layer 200. The antireflection layer 300 may include a division layer 310, a plurality of color filters 320, and a planarization layer 330.

In various embodiments, the division layer 310 may be disposed to overlap with the conductive pattern of the second conductive layer 204. The cover insulating layer 205 may be between the division layer 310 and the second conductive layer 204. In various embodiments, the cover insulating layer 205 may be omitted.

In various embodiments, the division layer 310 may prevent external light from being reflected by the second conductive layer 204. A material forming the division layer 310 is not particularly limited as long as it is a material that absorbs light. The division layer 310 may be a layer having a black color, and may include a black coloring agent. A black component may include a black dye and/or a black pigment. The black component may include carbon black, a metal such as chromium, or oxide thereof.

In various embodiments, a division opening 310-OP may be defined in the division layer 310. The division opening 310-OP may overlap the light emitting layer EL. The color filter 320 may correspond with the division opening 310-OP, where the color filter 320 may transmit light provided from the light emitting layer EL overlapping the color filter 320.

In various embodiments, the planarization layer 330 may cover the division layer 310 and the color filter 320. The planarization layer 330 may include an organic material and may provide a flat surface on a top surface of the planarization layer 330. In an embodiment, the planarization layer 330 may be omitted.

In an embodiment, the antireflection layer 300 may include a reflection control layer instead of the color filters 320. For example, in FIG. 7, the color filters 320 may be omitted, and the reflection control layer may be added in place of the color filters 320, that are omitted. The reflection control layer may selectively absorb light in a wavelength range (band) among the light reflected from the inside of the display panel and/or electronic device or light incident from the outside of the display panel and/or electronic device.

For example, the reflection control layer may absorb a first wavelength range of about 490 nm to about 505 nm and a second wavelength range of about 585 nm to about 600 nm, so that light transmittance in the first wavelength range and the second wavelength range is about 40% or less. The reflection control layer may absorb light having a wavelength outside of the wavelength range of red, green, and blue light emitted from the light emitting layer EL. The reflection control layer may absorb light having a wavelength that does not belong to a wavelength range of red, green, or blue light emitted from the light emitting layer EL, to prevent or minimize a decrease in luminance of the display panel and/or electronic device. In addition, simultaneously, deterioration in luminous efficiency of the display panel and/or electronic device may be prevented or minimized, and visibility may be improved.

In various embodiments, the reflection control layer may be provided with an organic material layer including a dye, a pigment, or a combination thereof. The reflection control layer may include a tetraazaporphyrin (TAP)-based compound, a porphyrin-based compound, a metal porphyrin-based compound, an oxazine-based compound, a squarylium-based compound, a triaryl triarylmethane-based compound, a polymethine-based compound, a traquinone-based compound, a phthalocyanine-based compound, an azo-based compound, a perylene-based compound, an xanthene-based compound, a diimmonium-based compound, a dipyrromethene-based compound, a cyanine-based compound, and combinations thereof.

In an embodiment, the reflection control layer may have transmittance of about 64% to about 72%. The transmittance of the reflection control layer may be adjusted according to an amount of pigment and/or dye contained in the reflection control layer.

In an embodiment of the inventive concept, the antireflection layer 300 may include a polarizing film instead of the division layer 310, the plurality of color filters 320, and the planarization layer 330. For example, the antireflection layer 300 may include a retarder and a polarizer. The retarder may be a film type or liquid crystal coating type retarder and may include a $\lambda/2$ retarder and/or a $\lambda/4$ retarder. The polarizer may also be a film type and may include a stretchable synthetic resin film. Each of the retarder and the polarizer may further include a protection film. The retarder and polarizer itself or the protection film may be defined as a base layer of the antireflection layer 300.

In various embodiments, the adhesive layer ADH may be disposed between the antireflection layer 300 and the window 400, where the adhesive layer ADH may include an optical clear adhesive, an optically clear adhesive resin, or a pressure sensitive adhesive (PSA).

In various embodiments, the window 400 may be disposed on the antireflection layer 300. The window 400 may include an optically transparent insulation material, where for example, the window 400 may include glass or plastic. The window 400 may have a single layered structure or a multilayered structure. For example, the window 400 may include a plurality of plastic films bonded to each other by using an adhesive or include a glass substrate and a plastic film, which are bonded to each other by using an adhesive.

Figure 5:
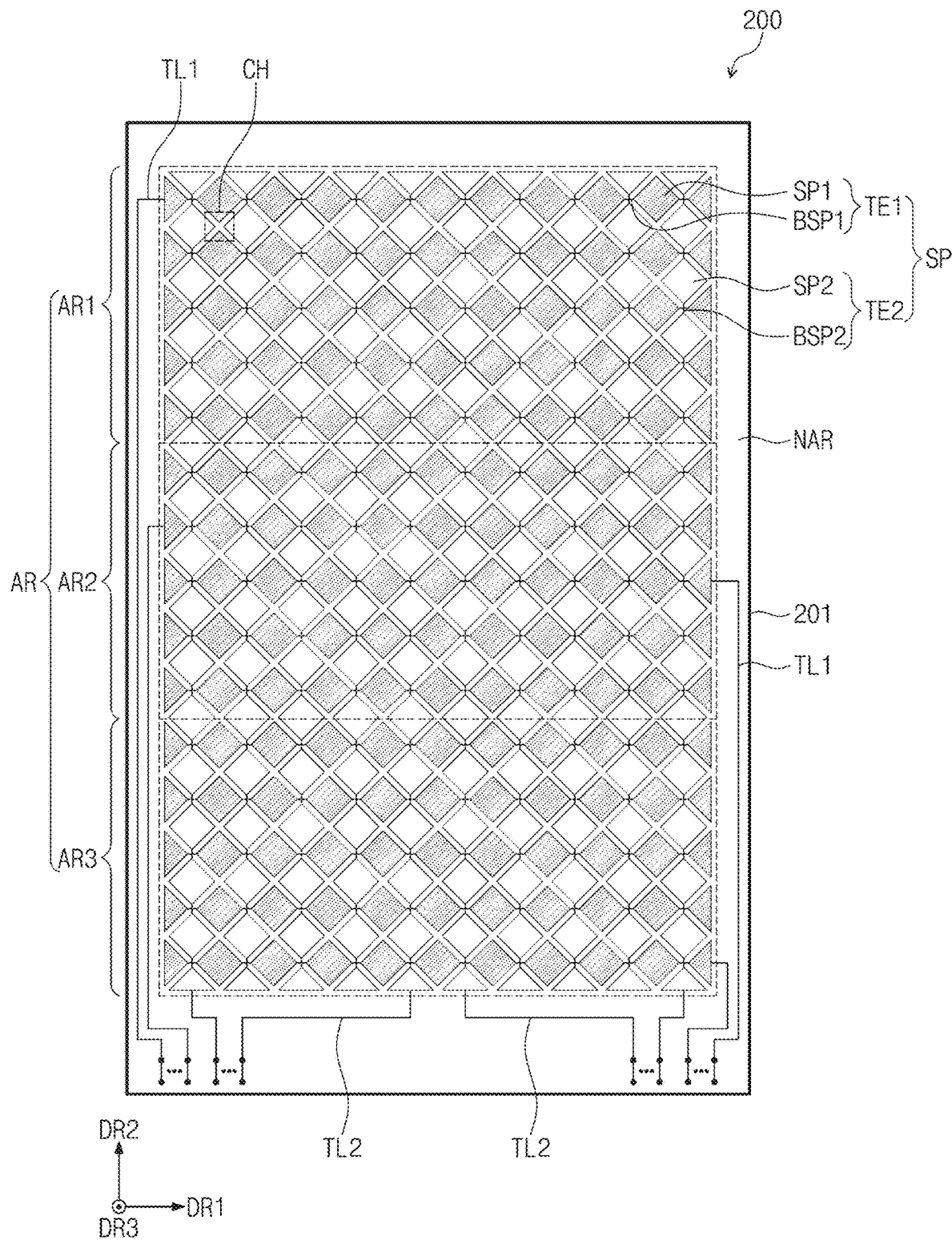
FIG. 5 is a plan view of a sensor layer according to an embodiment of the inventive concept.

FIG. 5 is a plan view of a sensor layer according to an embodiment of the inventive concept;

Referring to FIG. 5, the sensor layer 200 may include an active area AR and a peripheral area NAR positioned around the active area AR. The active area AR may be a region that is activated according to an electrical signal. The active area AR may be an area configured to sense an input applied from the outside. The active area AR may overlap the display area DP-DA (see FIG. 6A) of the display layer 100 (see FIG. 6A). The peripheral area NAR may overlap the display peripheral area DP-NDA (see FIG. 6A) of the display layer 100 (see FIG. 6A).

In various embodiments, the active area AR may include a first area AR1, a second area AR2, and a third area AR3, which are sequentially arranged in the second direction DR2.

In various embodiments, the sensor layer 200 may include a base layer 201, a plurality of sensing electrodes SP, and a plurality of sensing lines TL1 and TL2. The plurality of sensing electrodes SP may be disposed on the active area AR, and the plurality of sensing lines TL1 and TL2 may be disposed on the peripheral area NAR.

In various embodiments, the base layer 201 may be an inorganic layer containing at least one of silicon nitride, silicon oxynitride, or silicon oxide. The base layer 201 may be an organic layer including an epoxy resin, an acrylic resin, or an imide-based resin. The base layer 201 may be directly disposed on the display layer 100 (see FIG. 4). The base layer 201 may be coupled to the display layer 100 (see FIG. 4) through an adhesive member.

In various embodiments, the plurality of sensing electrodes SP may include a plurality of first sensing electrodes TE1 and a plurality of second sensing electrodes TE2, where the first sensing electrodes TE1 may be adjacent to the second sensing electrodes TE2. The plurality of second sensing electrodes TE2 may be electrically insulated from and intersect the plurality of first sensing electrodes TE1. The sensor layer 200 may acquire information on an external input through a change in capacitance between the plurality of first sensing electrodes TE1 and the plurality of second sensing electrodes TE2.

In various embodiments, each of the plurality of first sensing electrodes TE1 may extend in the first direction DR1, and the plurality of first sensing electrodes TE1 may be arranged in the second direction DR2. Each of the first electrodes TE1 may include a plurality of sensing patterns SP1 and a plurality of connection patterns BSP1. Each of the plurality of first connection patterns BSP1 may electrically connect two adjacent first sensing patterns SP1 to each other. The plurality of first sensing patterns SP1 and the plurality of first connection patterns BSP1 may have a mesh structure. The plurality of first sensing patterns SP1 may be referred to as a plurality of first sensing parts SP1. The plurality of first connection patterns BSP1 may be referred to as a plurality of first connection parts BSP1. The plurality of first sensing electrodes TE1 may be referred to as a plurality of sensing electrodes.

In various embodiments, each of the second sensing electrodes TE2 may extend in the second direction DR2, and the plurality of second sensing electrodes TE2 may be arranged in the first direction DR1. Each of the plurality of second sensing electrodes TE2 may include a plurality of second sensing patterns SP2 and a plurality of second connection patterns BSP2. Each of the plurality of second connection patterns BSP2 may electrically connect two adjacent second sensing patterns SP2 to each other. The plurality of second sensing patterns SP2 and the plurality of second connection patterns BSP2 may have a mesh structure. The plurality of second sensing patterns SP2 may be referred to as a plurality of second sensing parts SP2. The plurality of second connection patterns BSP2 may be referred to as a plurality of second connection parts BSP2.

In various embodiments, the plurality of first connection patterns BSP1 may be disposed on a layer different from a layer on which the plurality of second connection patterns BSP2 are disposed, where the first connection patterns BSP1 may be on a layer above or below the second connection patterns BSP2. The plurality of second connection patterns BSP2 may be electrically insulated from and intersect the plurality of first sensing electrodes TE1. For example, the plurality of first connection patterns BSP1 may be electrically insulated from and intersect the plurality of second connection patterns BSP2, respectively.

In various embodiments, each of the plurality of first sensing electrodes TE1 and the plurality of second sensing electrodes TE2 may define a plurality of channels CH. In response to an external input being applied to one or more of the plurality of channels CH, the sensor layer 200 may transmit a touch signal TS (see FIG. 9) to the sensor driving part 200C (see FIG. 2).

FIG. 5 illustrates that the plurality of sensing electrodes SP have a rectangular shape, but is not limited thereto. For example, the plurality of sensing electrodes SP may have a polygonal shape.

In various embodiments, the plurality of sensing electrodes SP may include a conductive material, where for example, the conductive material may include a metal or an alloy thereof. The metal may include gold (Au), silver (Ag), aluminum (Al), molybdenum (Mo), chromium (Cr), titanium (Ti), nickel (Ni), neodymium (Nd), copper (Cu), platinum (Pt), and the like. The plurality of sensing electrodes SP may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide (SiO2), carbon nanotubes, graphene, and the like. The plurality of sensing electrodes SP may be provided as a single layer or multiple layers.

In various embodiments, the plurality of sensing lines TL1 and TL2 may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

In various embodiments, the plurality of sensing lines TL1 may be electrically connected to the plurality of first sensing pads TD1 (see FIG. 6A) through contact holes, respectively. The plurality of second sensing lines TL2 may be electrically connected to the plurality of second sensing pads TD2 through the contact holes, respectively.

Figure 6A:
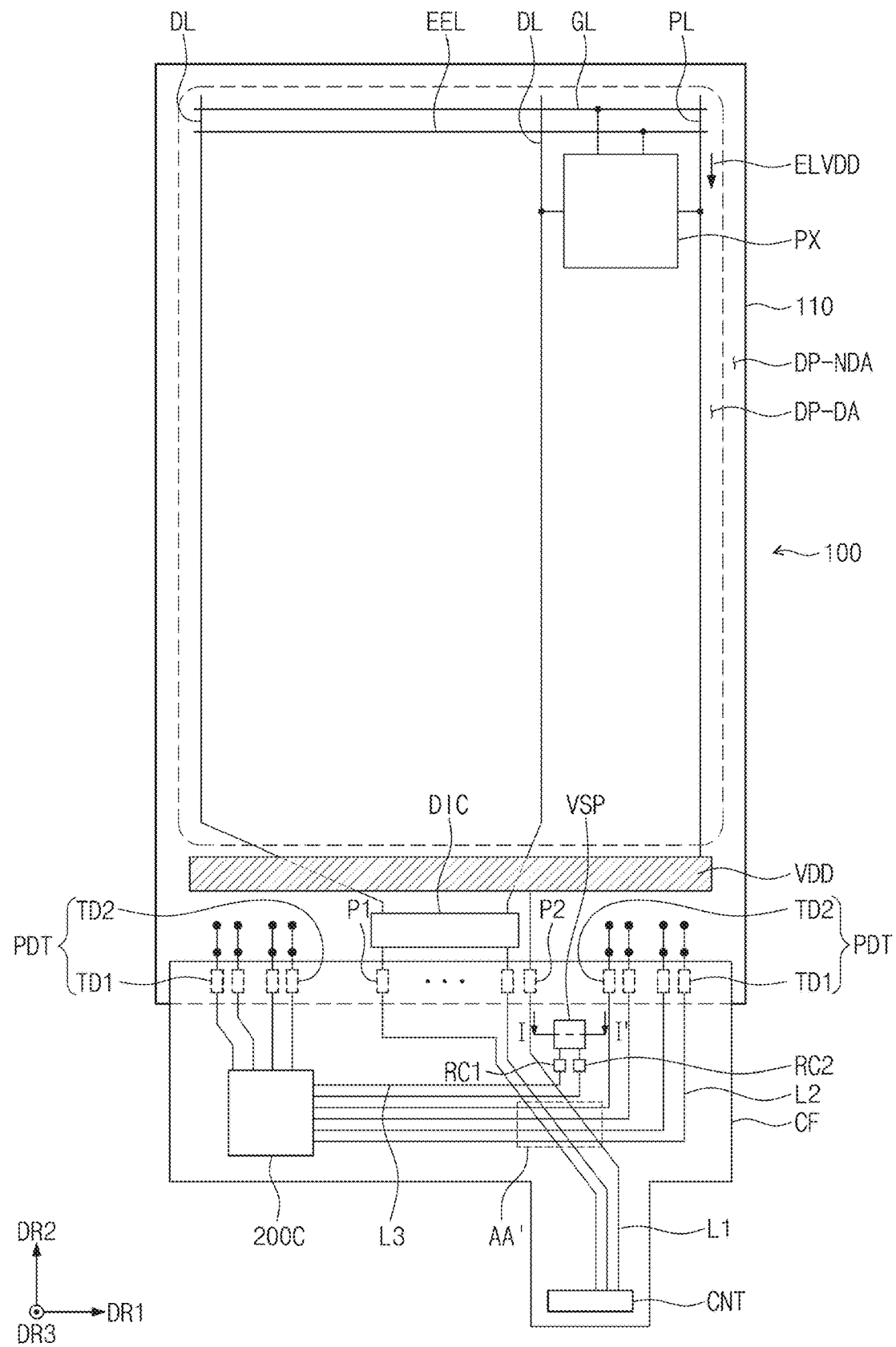
FIG. 6A is a plan view of a display layer, a flexible substrate, and a sensor driving part according to an embodiment of the inventive concept.

FIG. 6A is a plan view of a display layer, a flexible substrate, and a sensor driving part according to an embodiment of the inventive concept.

Referring to FIG. 6A, the electronic device 1000 may include a display layer 100, a power pattern VDD, a data driver DIC, a flexible circuit board CF, a sensor driving part 200C, a virtual sensor part VSP, a first RC circuit RC1, a second RC circuit RC2, a display signal line L1, a sensor signal line L2, a virtual sensor signal line L3, and a connector CNT.

In various embodiments, a display area DP-DA and a display peripheral area DP-NDA adjacent to the display area DP-DA may be defined on the display layer 100. The display area DP-DA may be an area on which an image is displayed. A plurality of pixels PX may be disposed on the active area DP-DA. The display peripheral area DP-NDA may be an area on which a driving circuit or driving line is disposed. Pixels PX may not be disposed on the display peripheral area DP-NDA.

In various embodiments, the display layer 100 may include a base layer 110, a plurality of pixels PX, a plurality of signal lines GL, DL, PL, and EEL, a plurality of display pads P1 and P2, and a plurality of sensing pads PDT.

In various embodiments, each of the pixels PX may display one of the primary colors or one of mixed colors. The main (primary) color may include a red, green, or blue color. The mixed color may include various colors such as white, yellow, cyan, or magenta. However, the embodiment of the inventive concept is not limited to the colors displayed by the pixels PX.

In various embodiments, a plurality of signal lines GL, DL, PL, and EEL may be disposed on the base layer 110. The plurality of signal lines GL, DL, PL, and EEL may be connected to the plurality of pixels PX to transmit an electrical signal to the plurality of pixels PX. The plurality of signal lines GL, DL, PL, and EEL include a plurality of scan lines GL, a plurality of data lines DL, a plurality of power lines PL, and a plurality of emission control lines EEL. However, this is merely an example, and the configurations of the signal lines GL, DL, PL, and EL according to an embodiment of the inventive concept is not limited thereto. For example, the plurality of signal lines GL, DL, PL, and EEL according to an embodiment of the inventive concept may further include an initialization voltage line.

In various embodiments, the power pattern VDD may be disposed on the display peripheral area DP-NDA. The power pattern VDD may be electrically connected to the plurality of power lines PL. Each of the plurality of pixels PX may receive the power voltage ELVDD provided by the power line PL.

In various embodiments, the plurality of display pads P1 and P2 may be disposed on the display peripheral area DP-NDA. The display pads P1 and P2 may include a first pad P1 and a second pad P2. The first pad P1 may be provided in plurality. The plurality of first pads P1 may be connected to the plurality of data lines DL, respectively. The second pad P2 may be connected to the power pattern VDD and electrically connected to the power line PL. The display layer 100 may provide electrical signals provided from the outside to the plurality of pixels PX through the plurality of display pads P1 and P2. The plurality of display pads P1 and P2 may further include pads for receiving other electrical signals in addition to the first pad P1 and the second pad P2.

In various embodiments, the data driver DIC may be mounted on the display peripheral area DP-NDA. The data driver DIC may be a timing control circuit in the form of a chip. The data driver DIC may output grayscale voltages to the plurality of data lines DL in response to frame data of the image data RGB (see FIG. 2). The plurality of data lines DL may be electrically connected to the plurality of first pads P1 via the data driver DIC, respectively. However, this is merely an example, and the data driver DIC may be mounted on a film that is separated from the display layer 100. The data driver DIC may be electrically connected to the plurality of display pads P1 and P2 through the film.

In various embodiments, the plurality of sensing pads PDT may be disposed on the display peripheral area DP-NDA. The plurality of sensing pads PDT may be electrically connected to each of the plurality of sensing electrodes SP (see FIG. 5) of the sensor layer 200 (see FIG. 5). The plurality of sensing pads PDT may include a plurality of first sensing pads TD1 and a plurality of second sensing pads TD2.

In various embodiments, the flexible circuit board CF may be physically and electrically connected to the display layer 100. The flexible circuit board CF may be electrically connected to the plurality of display pads P1 and P2 and the plurality of sensing pads PDT.

In various embodiments, the sensor driving part 200C, the virtual sensor part VSP, the first RC circuit RC1, the second RC circuit RC2, and the connector CNT may be disposed on the flexible circuit board CF.

In various embodiments, the sensor driving part 200C may drive the sensor layer 200 (see FIG. 5). The sensor driving part 200C may be electrically connected to the plurality of sensing pads PDT.

In various embodiments, the display signal line L1 may be electrically connected between the display layer 100 and the controller 1000C (see FIG. 2), where for example, the display signal line L1 may be electrically connected between the plurality of display pads P1 and P2 and the connector CNT. The display signal line L1 may transmit and receive data signals DATA (see FIG. 9). The display signal line L1 may be disposed on the flexible circuit board CF. The display signal line L1 may be referred to as a MIPI line.

In various embodiments, the connector CNT may electrically connect the controller 1000C to the display layer 100.

In various embodiments, the sensor signal line L2 may be disposed on the flexible circuit board CF. The sensor signal line L2 may be electrically connected between the sensor layer 200 and the sensor driving part 200C. For example, the sensor signal line L2 may be connected between the plurality of sensing pads PDT and the sensor driving part 200C. The plurality of sensing electrodes SP (see FIG. 5) may transmit a touch signal TS (see FIG. 9) through the sensor signal line L2, where the sensor driving part 200C may receive the touch signal TS (see FIG. 9) from the plurality of sensing electrodes (SP (see FIG. 5)). When viewed in a plan view, the sensor signal line L2 may cross the display signal line L1. The touch signal TS (see FIG. 9) transmitted by the sensing electrodes SP may include noise.

In various embodiments, the virtual sensor signal line L3 may be disposed on the flexible circuit board CF. The virtual sensor signal line L3 may be electrically connected between the virtual sensor part VSP and the sensor driving part 200C, where for example, the virtual sensor signal line L3 may be connected between the plurality of virtual electrodes VM (see FIG. 7) and the sensor driving part 200C. The plurality of virtual electrodes VM (see FIG. 7) may transmit a first noise signal NS1 (see FIG. 10A) through the virtual sensor signal line L3, where the sensor driving part 200C may receive the first noise signal NS1 (see FIG. 10A) from the plurality of virtual electrodes VM (see FIG. 7). When viewed in the plan view, the virtual sensor signal line L3 may cross the display signal line L1, and the first noise signal NS1 (see FIG. 10A) may include noise. The virtual sensor signal line L3 may be electromagnetically shielded except for a portion intersecting the display signal line L1.

Figure 7:
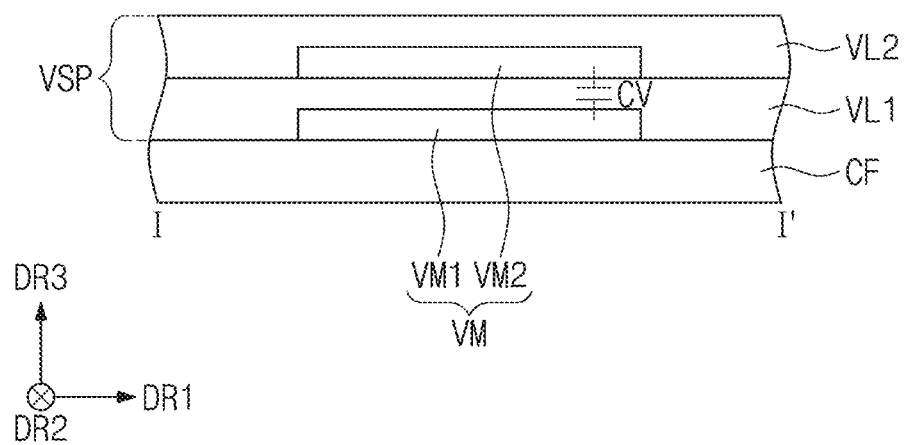
FIG. 7 is a cross-sectional view taken along line I-I' of FIG. 6A according to an embodiment of the inventive concept.

In various embodiments, the virtual sensor part VSP may include a plurality of virtual electrodes VM (see FIG. 7). A portion of the plurality of virtual electrodes VM (see FIG. 7) may be electrically connected to the first RC circuit RC1. The first RC circuit RC1 may be electrically connected to the sensor driving part 200C. That is, the first RC circuit RC1 may be connected between the sensor driving part 200C and the virtual sensor part VSP.

In various embodiments, the other portion of the plurality of virtual electrodes VM (see FIG. 7) may be electrically connected to the second RC circuit RC2. The second RC circuit RC2 may be electrically connected to the sensor driving part 200C. That is, the second RC circuit RC2 may be connected between the sensor driving part 200C and the virtual sensor part VSP.

In various embodiments, the virtual sensor part VSP may transmit the first noise signal NS1 (see FIG. 10A) to the sensor driving part 200C. That is, the sensor driving part 200C may receive the first noise signal NS1 (see FIG. 10A) from the plurality of virtual electrodes VM (see FIG. 7).

In various embodiments, each of the first RC circuit RC1 and the second RC circuit RC2 may include a passive element. The passive element may be an element having a function of consuming, storing, or transmitting electrical energy. For example, the passive component may include a resistor, a capacitor, and/or an inductor.

Figure 9:
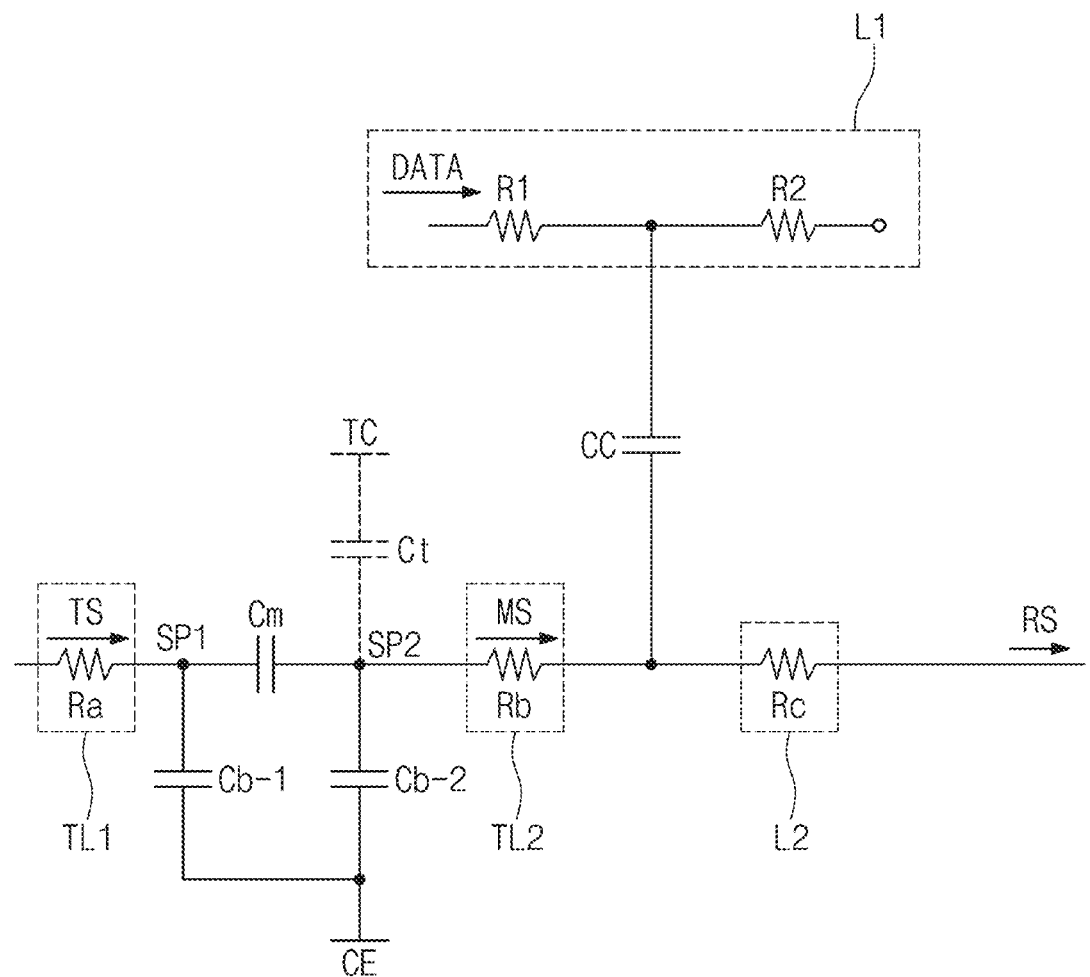
FIG. 9 is a circuit diagram illustrating an electrical connection relationship between a sensor layer, a display signal line, and a sensor signal line according to an embodiment of the inventive concept.
Figure 10A:
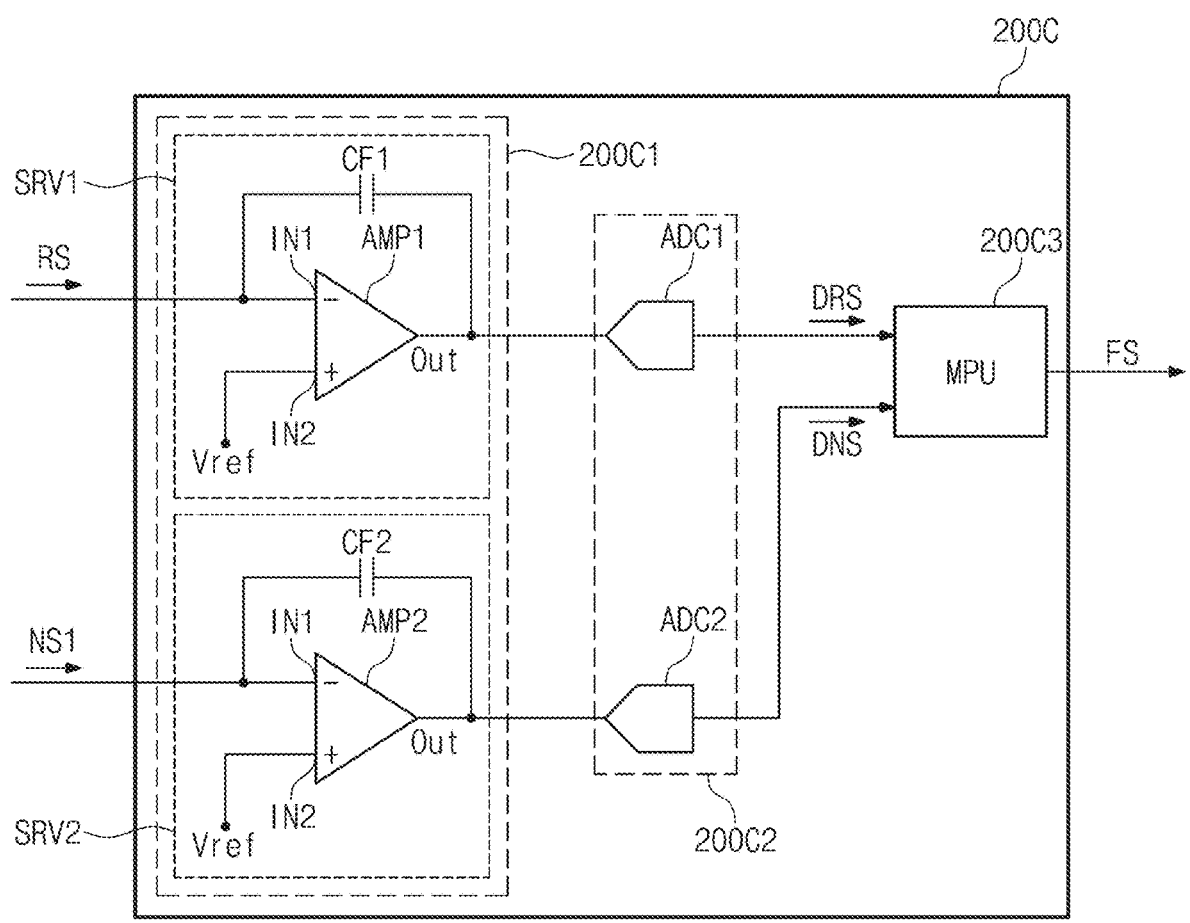
FIG. 10A is a view illustrating operations of a sensor layer and a control part according to an embodiment of the inventive concept.

In various embodiments, the first RC circuit RC1 and the second RC circuit RC2 may control a magnitude of the first noise signal NS1 (see FIG. 10A). For example, the first RC circuit RC1 and the second RC circuit RC2 may control a magnitude of the first noise signal NS1 (see FIG. 10A) to be similar to a magnitude of the touch signal TS (see FIG. 9). For example, each of the first RC circuit RC1 and the second RC circuit RC2 may have a predetermined RC value.

In various embodiments, the sensor driving part 200C may subtract the received first noise signal NS1 (see FIG. 10A) and the touch signal TS (see FIG. 9). This will be described later.

Figure 6B:
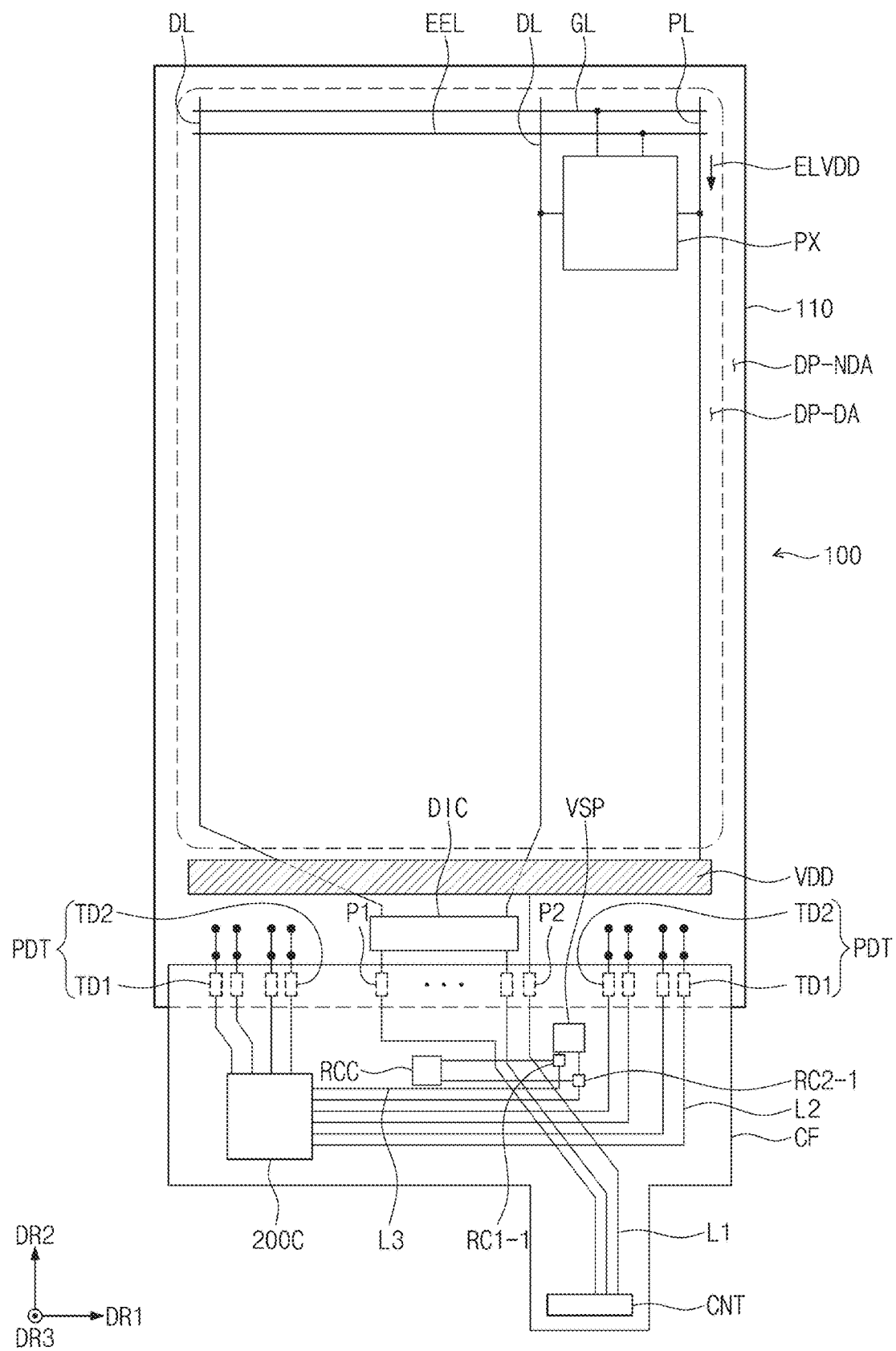
FIG. 6B is a plan view of a display layer, a flexible substrate, and a sensor driving part according to an embodiment of the inventive concept.

FIG. 6B is a plan view of a display layer, a flexible substrate, and a sensor driving part according to an embodiment of the inventive concept. In descriptions of FIG. 6B, the same reference numerals are given to the components described through FIG. 6A, and descriptions thereof are omitted.

Referring to FIG. 6B, the electronic device 1000 (see FIG. 1) may further include a display layer 100, a power pattern VDD, a data driver DIC, a flexible circuit board CF, a sensor driving part 200C, a virtual sensor part VSP, a first RC circuit RC1-1, a second RC circuit RC2-1, a display signal line L1, sensor signal line L2, a virtual sensor signal line L3, a connector CNT, and a circuit controller RCC.

In various embodiments, each of the first RC circuit RC1-1 and the second RC circuit RC2-1 may include an active element. The active element may refer to an element having a function of amplifying or converting electrical energy. For example, the active element may include an amplifier, a diode, and/or a transistor.

When the first RC circuit RC1-1 and the second RC circuit RC2-1 include the active elements, the circuit controller RCC may be further disposed on the flexible circuit board CF. The circuit controller RCC may control each of the first RC circuit RC1-1 and the second RC circuit RC2-1 to have a predetermined RC value. For example, each of the first RC circuit RC1-1 and the second RC circuit RC2-1 may have a variable RC value.

FIG. 7 is a cross-sectional view taken along line I-I' of FIG. 6A according to an embodiment of the inventive concept.

Referring to FIGS. 6A and 7, the virtual sensor part VSP may include a plurality of virtual electrodes VM, a first insulating layer VL1, and a second insulating layer VL2. The first virtual electrode VM1 to be described below may be disposed on the flexible circuit board CF.

In various embodiments, the plurality of virtual electrodes VM may include a first virtual electrode VM1 and a second virtual electrode VM2. The first insulating layer VL1 may be disposed on the first virtual electrode VM1. The second virtual electrode VM2 may be disposed on the first insulating layer VL1, where the first insulating layer VL1 separates the first virtual electrode VM1 from the second virtual electrode VM2. The second insulating layer VL2 may be disposed on the second virtual electrode VM2. The first virtual electrode M1 and the second virtual electrode VM2 may be disposed on different layers.

In various embodiments, a capacitor CV may be disposed between the first virtual electrode VM1 and the second virtual electrode VM2. Capacitance of the capacitor CV may be designed to be substantially the same as that of the capacitor disposed between the first sensing electrode TE1 (see FIG. 5) and the second sensing electrode TE2 (see FIG. 5).

In various embodiments, each of the first virtual electrode VM1 and the second virtual electrode VM2 may have a single-layer structure or a multi-layer structure stacked in the third direction DR3. Each of the first virtual electrode VM1 and the second virtual electrode VM2 may be referred to as a conductive layer.

In various embodiments, the conductive layer having the single-layered structure may include a metal layer or a transparent conductive layer, where the metal layer may include molybdenum, silver, titanium, copper, aluminum, or an alloy thereof, and the transparent conductive layer may include a transparent conductive oxide such as indium-tin oxide (ITO), indium-zinc oxide (IZnO), zinc oxide (ZnO), or indium-zinc-tin oxide (IZTO). In addition, the transparent conductive layer may include conductive polymers such as poly(3,4-ethylenedioxythiophene) (PEDOT), metal nanowires, graphene, and the like.

In various embodiments, the conductive layer having the multilayered structure may include metal layers. The metal layers may have a three-layered structure of titanium/aluminum/titanium. The conductive layer having the multilayered structure may include at least one metal layer and at least one transparent conductive layer.

At least one of the first insulating layer VL1 or the second insulating layer VL2 may include an inorganic layer. The inorganic layer may include at least one of oxide, titanium oxide, silicon oxide, silicon nitride, silicon oxynitride, zirconium oxide, or hafnium oxide.

At least one of the first insulating layer VL1 or the second insulating layer VL2 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. The plurality of virtual electrodes VM may be electromagnetically shielded by the first insulating layer VL1 and the second insulating layer VL2, so that external environmental noise is not introduced.

Figure 8A:
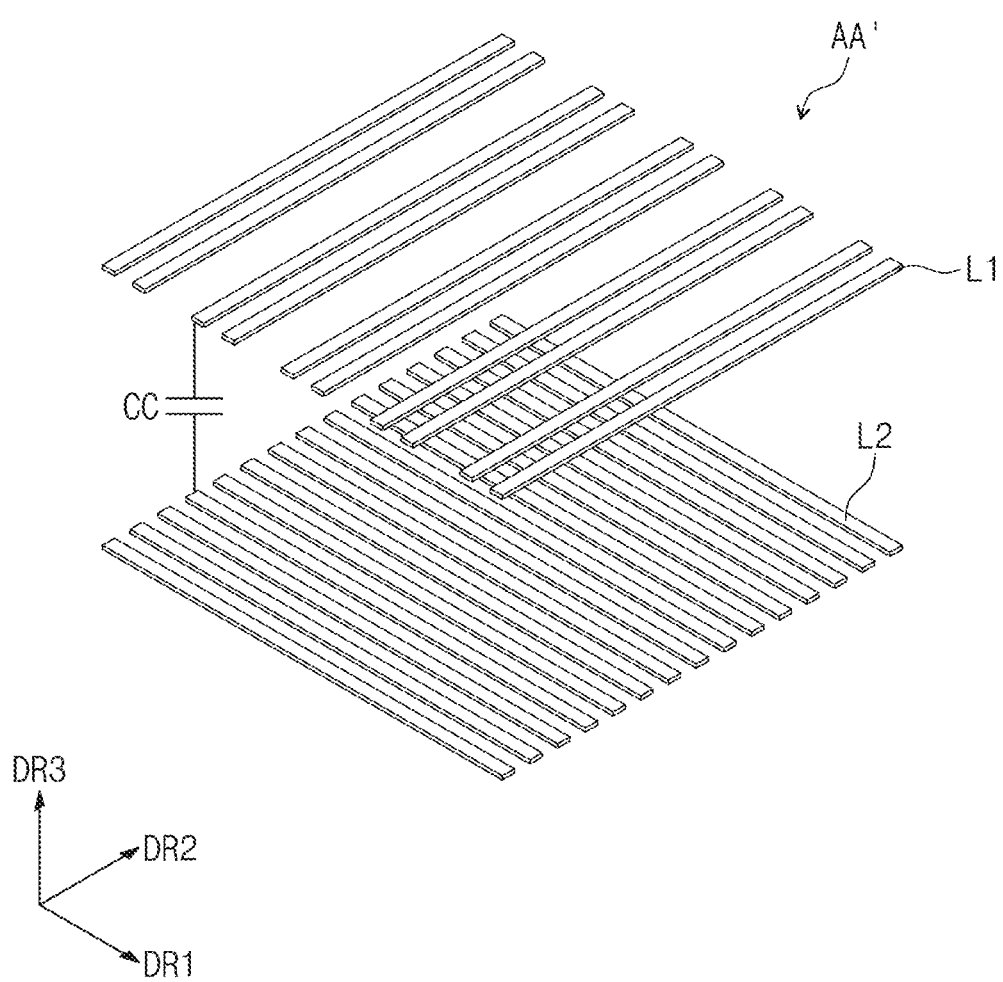
FIG. 8A is an exploded perspective view of an area AA' of FIG. 6A according to an embodiment of the inventive concept.

FIG. 8A is an exploded perspective view of an area AA' of FIG. 6A according to an embodiment of the inventive concept.

Referring to FIGS. 6A and 8A, the display signal line L1 and the sensor signal line L2 may be disposed on the flexible circuit board CF. For example, the sensor signal line L2 may be disposed on the flexible circuit board CF, and the display signal line L1 may be disposed on the sensor signal line L2. The display signal line L1 and the sensor signal line L2 may be spaced apart from each other in the third direction DR3.

When viewed in the plan view, the display signal line L1 and the sensor signal line L2 may cross and overlap each other. A predetermined interference capacitor CC may be disposed between the display signal line L1 and the sensor signal line L2.

In various embodiments, a separate layer for shielding electromagnetic fields may not be disposed between the display signal line L1 and the sensor signal line L2. As a result, the layer disposed on the flexible circuit board CF may be reduced, and thus, the flexible circuit board CF may be reduced in thickness. In addition, a degree of freedom may increase in designing the layer disposed on the flexible circuit board CF. Thus, the electronic device 1000 (see FIG. 1) having improved reliability may be provided.

Figure 8B:
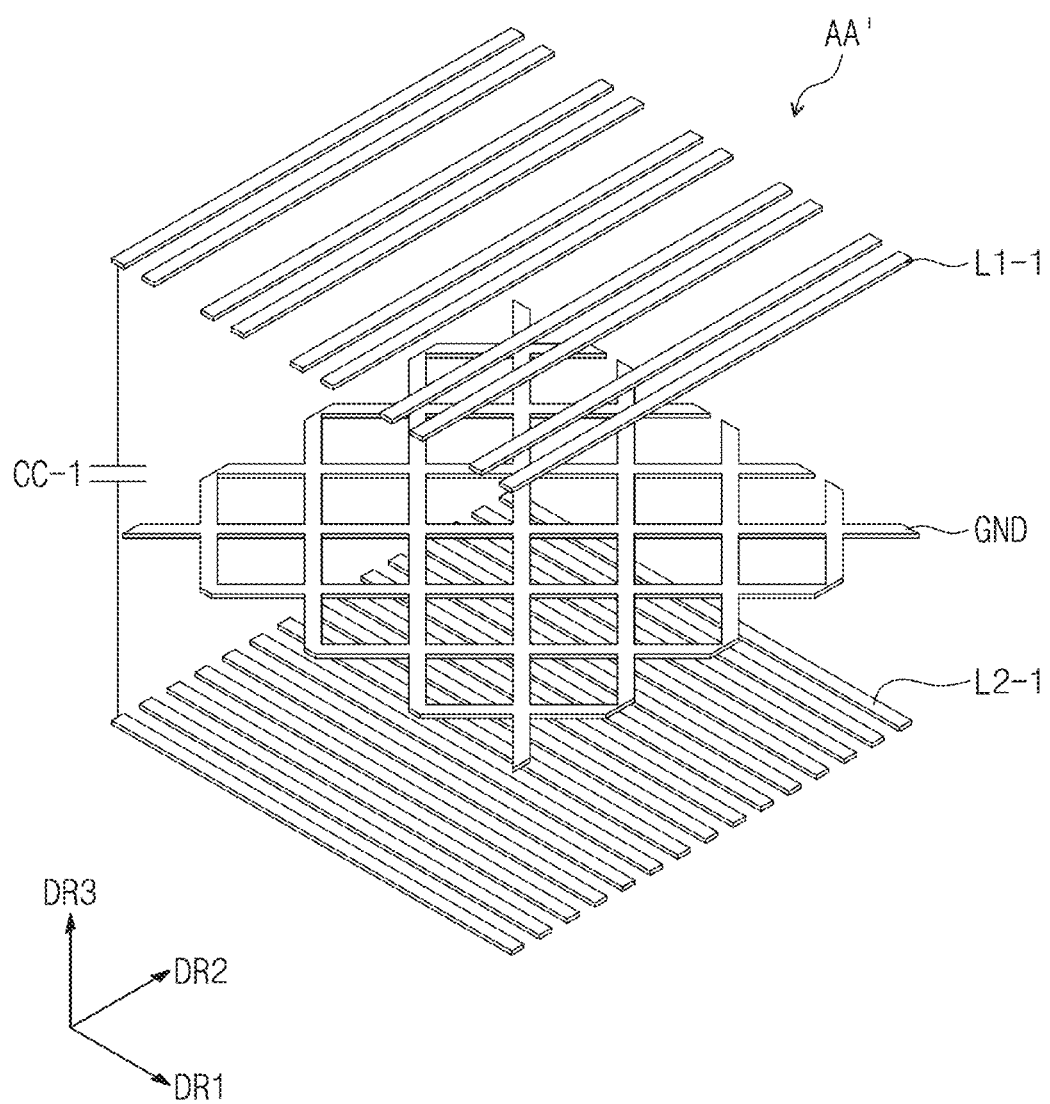
FIG. 8B is an exploded perspective view illustrating an area corresponding to the area AA' of FIG. 6A according to an embodiment of the inventive concept.

FIG. 8B is an exploded perspective view of the area AA' of FIG. 6A according to an embodiment of the inventive concept.

Referring to FIGS. 6A and 8B, a display signal line L1-1, a sensor signal line L2-1, and a ground layer GND may be disposed on the flexible circuit board CF. For example, the sensor signal line L2-1 may be disposed on the flexible circuit board CF, the ground layer GND may be disposed on the sensor signal line L2-1, and the display signal line L1-1 may be disposed on the ground layer GND. The display signal line L1-1 and the sensor signal line L2-1 may be spaced apart from each other in the third direction DR3 with the ground layer GND therebetween.

In various embodiments, the ground layer GND may be disposed between the display signal line L1-1 and the sensor signal line L2-1, where the ground layer GND may separate the display signal line L1-1 from the sensor signal line L2-1. The ground layer GND may be disposed to minimize an electrical interference between the display signal line L1-1 and the sensor signal line L2-1. The ground layer GND may have a mesh structure for impedance matching of the display signal line L1-1. However, the shape of the ground layer GND is not limited thereto. For example, the ground layer GND may be provided as a solid plate, or the ground layer GND may be provided as a plurality of sections.

When viewed in the plan view, the display signal line L1-1 and the sensor signal line L2-1 may cross and overlap each other. A predetermined interference capacitor CC-1 may be disposed between the display signal line L1-1 and the sensor signal line L2-1.

FIG. 9 is a circuit diagram illustrating an electrical connection relationship between the sensor layer, the display signal line, and the sensor signal line according to an embodiment of the inventive concept.

Referring to FIGS. 4, 6A, and 9, the first sensing line TL1 may have a first sensing resistance Ra. A touch signal TS may be provided to the first sense line TL1.

In various embodiments, a parasitic capacitor Cb may include a first parasitic capacitor Cb-1 between the first sensing part SP1 of the first sensing electrode TE1 (see FIG. 5) and the second electrode CE, and a second parasitic capacitor Cb-2 between the second sensing part SP2 of the second sensing electrode TE2 (see FIG. 5) and the second electrode CE.

In various embodiments, a change in capacitance of a mutual capacitor Cm electrically connected between the first sensing part SP1 and the second sensing part SP2 may occur at a corresponding point according to the external input TC. A sensing capacitor Ct may be electrically connected between the external input TC and the sensing electrodes SP (e.g., SP2) according to the external input TC. The sensing capacitor Ct may include a first sensing capacitor disposed between the external input TC and the first sensing part SP1 and a second sensing capacitor disposed between the external input TC and the second sensing part SP2.

In various embodiments, the second sense line TL2 may have second sensing resistance Rb. A reception signal MS may be provided to the second sensing line TL2.

When an input is received from the outside, a component caused by the capacitance of each of the first sensing capacitor and the second sensing capacitor may be provided to the reception signal MS.

In various embodiments, the display signal line L1 may have first resistance R1 and second resistance R2. A data signal DATA may be provided to the display signal line L1.

In various embodiments, the sensor signal line L2 may have third resistance Rc. A touch signal RS may be provided to the sensor signal line L2.

In various embodiments, an interference capacitor CC may be disposed between the display signal line L1 and the sensor signal line L2.

FIG. 10A is a view illustrating an operation of a sensor driving part according to an embodiment of the inventive concept.

Referring to FIGS. 6A, 9, and 10A, the sensor driving part 200C may include a signal receiver 200C1, a converter 200C2, and a signal processor 200C3.

In various embodiments, the signal receiver 200C1 may include a first signal receiver SRV1 and a second signal receiver SRV2.

In various embodiments, the first signal receiver SRV1 may include a first operational amplifier AMP1 and a first capacitor CF1. The sensor signal line L2 may be connected to the first input terminal IN1 of the first operational amplifier AMP1, so that the touch signal RS is received by the first operational amplifier AMP1, which may be an inverting input. The touch signal RS may be applied to the first input terminal IN1 of the first signal receiver SRV1. A reference signal Vref operating at a constant period may be input to the second input terminal IN2 of the first operational amplifier AMP1, which may be the non-inverting input. The first capacitor CF1 may be connected between the first input terminal IN1 of the first operational amplifier AMP1 and an output terminal Out of the first operational amplifier AMP1. A gain of the first operational amplifier AMP1 may correspond to the capacitance of the first capacitor CF1. The first capacitor CF1 may accumulate a voltage applied through the sensor signal line L2.

In various embodiments, the second signal receiver SRV2 may include a second operational amplifier AMP2 and a second capacitor CF2. The first noise signal NS1 may be received by the first input terminal IN1 of the second operational amplifier AMP2, which may be an inverting input. The first noise signal NS1 may be applied to the first input terminal IN1 of the second signal receiver SRV2. A reference signal Vref operating at a constant period may be input to the second input terminal IN2 of the second operational amplifier AMP2. The second capacitor CF2 may be connected between the first input terminal IN1 of the second operational amplifier AMP2 and the output terminal Out of the first operational amplifier AMP1. A gain of the second operational amplifier AMP2 may correspond to the capacitance of the second capacitor CF2. The second capacitor CF2 may accumulate a voltage corresponding to the applied first noise signal NS1.

In various embodiments, the converter 200C2 may include an analog digital converter (ADC). The converter 200C2 may include a first converter ADC1 and a second converter ADC2. The converter 200C2 may convert an input analog signal into a digital signal. The first converter ADC1 may convert an analog signal corresponding to the touch signal RS into a digital touch signal DRS. The second converter ADC2 may convert an analog signal corresponding to the first noise signal NS1 into a digital noise signal DNS. The sensor driving part may be configured to subtract a mean value of a plurality of digital noise signals DNS from the digital touch signal DRS of the touch signal RS.

In various embodiments, the signal processor 200C3 may signal-process the converted signal (digital signal) from the converter 200C2 and detect an external input according to the signal processing result. The signal processor 200C3 may subtract the digital touch signal DRS and the digital noise signal DNS to output a noise reduction signal FS. For example, the signal processor 200C3 may comprehensively analyze signals input from the plurality of sensing electrodes SP (see FIG. 5) through the signal receiver 200C1 and the converter 200C2 to detect a touch input. The signal processor 200C3 may be implemented as a microprocessor (MPU) or microcontroller (MCU), according to an embodiment. The electronic device 1000 (see FIG. 1) may determine an external input based on the reduction signal FS.

When noise is measured with a noise line disposed on the flexible circuit board CF without the virtual sensor part VSP, a magnitude and phase difference between the touch signal and the noise signal measured from the plurality of sensing electrodes SP (see FIG. 5) of the sensor layer 200 (see FIG. 5) may increase, and thus need to be corrected, and when noise is measured using a dummy electrode disposed adjacent to the plurality of sensing electrodes SP (see FIG. 5) without the virtual sensor part VSP, a capacitance change due to a touch operation on the dummy electrode may also be measured, and the touch signal may be mistaken for a noise signal and removed. However, according to the inventive concept, the electronic device 1000 (see FIG. 1) may include the virtual sensor part VSP disposed on the flexible circuit board CF. The sensor driving part 200C may subtract the first noise signal NS1 received from the virtual sensor part VSP and the touch signal RS received from the sensor layer 200 (see FIG. 5). Thus, the sensor driving part 200C may obtain a reduction signal FS in which only the noise signal is subtracted. Therefore, the electronic device 1000 (see FIG. 1) having improved sensing reliability may be provided.

In various embodiments, the first noise signal NS1 may be subtracted from the touch signal RS to remove the noise, where a separate layer for shielding the electromagnetic field may not be provided between the display signal line L1 and the sensor signal line L2. As a result, the number and surface area of layers disposed on the flexible circuit board CF may be reduced. In addition, a degree of freedom may increase in designing the layer disposed on the flexible circuit board CF. Thus, the electronic device 1000 (see FIG. 1) having improved reliability may be provided.

Figure 10B:
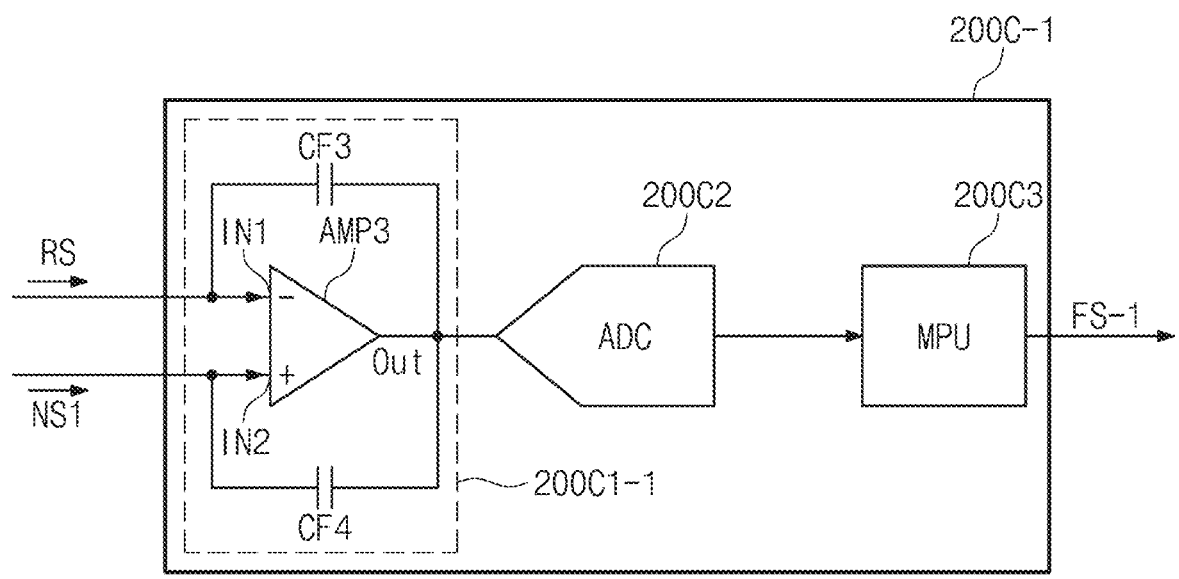
FIG. 10B is a view illustrating operations of a sensor layer and a control part according to an embodiment of the inventive concept.

FIG. 10B is a view illustrating an operation of the sensor driving part according to an embodiment of the inventive concept. In descriptions of FIG. 10B, the same reference numerals are used for components described through FIG. 10A, and descriptions thereof are omitted.

Referring to FIGS. 6A, 9, and 10B, the sensor driving part 200C-1 may include a signal receiver 200C1-1, a converter 200C2, and a signal processor 200C3.

In various embodiments, the signal receiver 200C1-1 may include a third operational amplifier AMP3, a third capacitor CF3, and a fourth capacitor CF4.

In various embodiments, the sensor signal line L2 may be connected to the first input terminal IN1 of the third operational amplifier AMP3, so the touch signal RS is received by the third operational amplifier AMP3. The touch signal RS may be received by the first input terminal IN1 of the signal receiver 200C1-1, which may be an inverting input.

In various embodiments, the first noise signal NS1 may be applied to the second input terminal IN2 of the third operational amplifier AMP3, which may be a non-inverting input. The first noise signal NS1 may be applied to the second input terminal IN2 of the signal receiver 200C1-1.

In various embodiments, the third capacitor CF3 may be connected between the first input terminal IN1 of the third operational amplifier AMP3 and an output terminal Out of the third operational amplifier AMP3. The third capacitor CF3 may accumulate a voltage applied through the sensor signal line L2.

In various embodiments, the fourth capacitor CF4 may be connected between the first input terminal IN1 of the third operational amplifier AMP3 and the output terminal Out of the third operational amplifier AMP3. The fourth capacitor CF4 may accumulate a voltage corresponding to the applied first noise signal NS1.

In various embodiments, the third operational amplifier AMP3 may generate an analog signal that is a difference between the applied touch signal RS and the first noise signal NS1. As a result, the analog signal provided to the converter 200C2 may be a touch signal RS from which the noise has been removed.

In various embodiments, the converter 200C2 may convert the analog signal into a digital signal. The signal processor 200C3 may receive and process the digital signal from the output terminal Out of the third operational amplifier AMP3. The digital signal may be a reduction signal FS-1. The electronic device 1000 (see FIG. 1) may determine an external input based on the reduction signal FS-1.

In various embodiments, the electronic device 1000 (see FIG. 1) may include the virtual sensor part VSP disposed on the flexible circuit board CF. The sensor driving part 200C-1 may subtract the first noise signal NS1 received from the virtual sensor part VSP from the touch signal RS received from the sensor layer 200 (see FIG. 5). Thus, the sensor driving part 200C-1 may obtain a reduction signal FS in which the noise signal has been subtracted. Therefore, the electronic device 1000 (see FIG. 1) having improved sensing reliability may be provided.

In various embodiments, the first noise signal NS1 may be subtracted from the touch signal RS to remove the noise, where a separate layer for shielding the electromagnetic field may not be provided between the display signal line L1 and the sensor signal line L2. As a result, the number and surface area of layers disposed on the flexible circuit board CF may be reduced. In addition, a degree of freedom may increase in designing the layer disposed on the flexible circuit board CF. Thus, the electronic device 1000 (see FIG. 1) having improved reliability may be provided.

Figure 11:
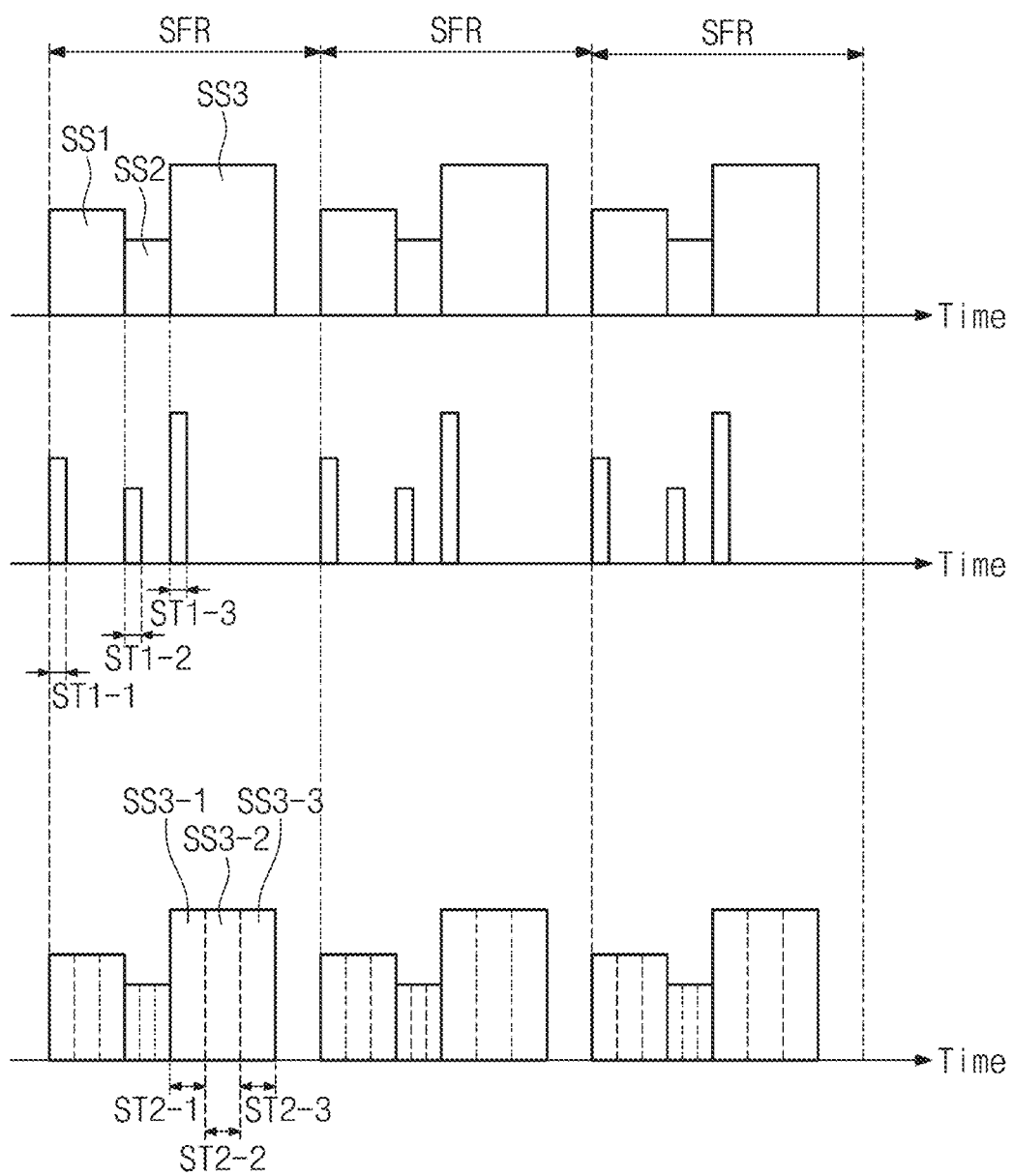
FIG. 11 is a conceptual view for explaining operations of the sensor layer and an RC circuit according to an embodiment of the inventive concept.
Figure 12E:
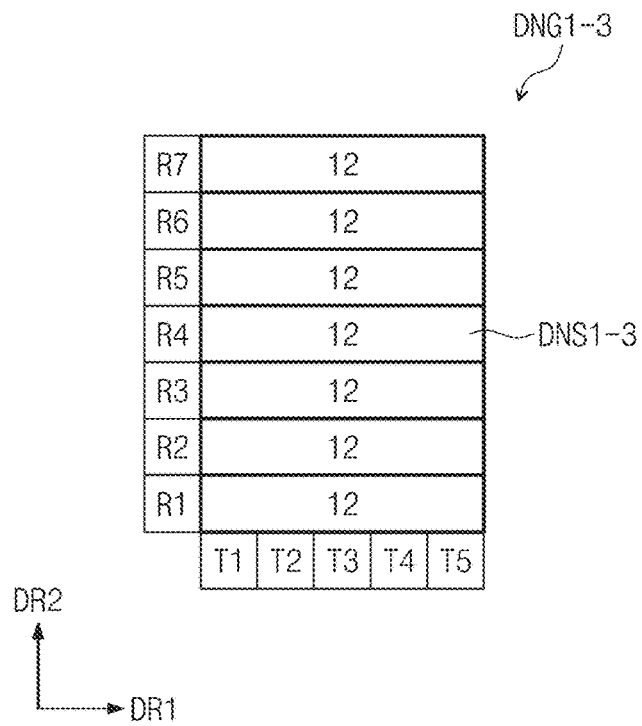
Figure 12F:
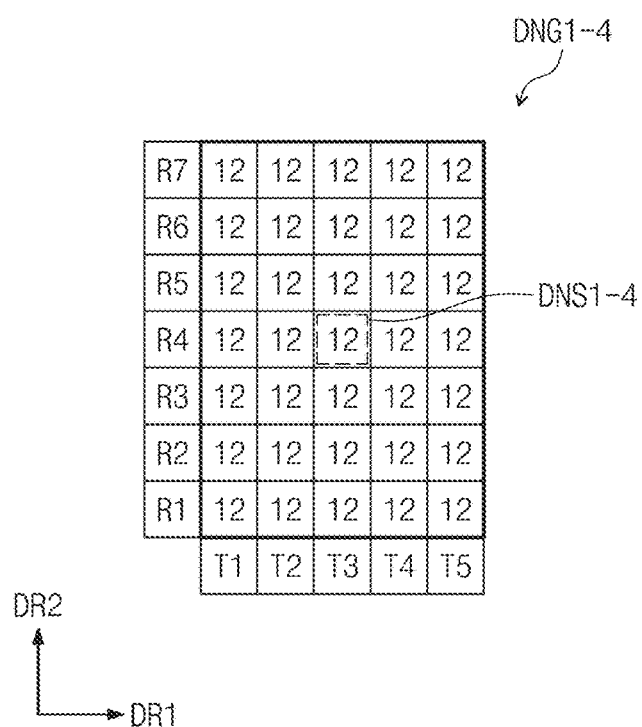

FIG. 11 is a conceptual view for explaining operations of the sensor layer and an RC circuit according to an embodiment of the inventive concept;

Referring to FIGS. 5, 6A, and 11, the sensor layer 200, the first RC circuit RC1, and the sensor driving part 200C may be driven in a unit of a sensing frame SFR.

In various embodiments, the sensing frame SFR may include a first section SS1, a second section SS2, and a third section SS3. The sensor layer 200 and the sensor driving part 200C may be sequentially driven in the first section SS1, the second section SS2, and the third section SS3.

In the first section SS1 and the second section SS2, the sensor driving part 200C may receive the touch signal RS in a self-touch manner. The self-touch method may refer to a method in which the plurality of first sensing electrodes TE1 and the plurality of second sensing electrodes TE2 are integrated into one electrode to sense an external input.

In the third section SS3, the sensor driving part 200C may receive the touch signal RS in a mutual touch method. The mutual touch method may refer to a method in which the plurality of first sensing electrodes TE1 and the plurality of second sensing electrodes TE2 are capacitively coupled to sense an external input.

A first-1 sampling section ST1-1 may be synchronized with the first section SS1. The first RC circuit RC1 may control a magnitude of the first noise signal NS1 in the first-1 sampling section ST1-1 corresponding to the first section SS1 during the sensing frame SFR. Here, the first RC circuit RC1 may control a magnitude of the first noise signal NS1 to be similar to the magnitude of the touch signal RS received in the first section SS1. The first-1 sampling section ST1-1 may be less than the first section SS1.

The first-2 sampling section ST1-2 may be synchronized with the second section SS2. The first RC circuit RC1 may control a magnitude of the first noise signal NS1 in the first-2 sampling section ST1-2 corresponding to the second section SS2 during the sensing frame SFR. Here, the first RC circuit RC1 may control the magnitude of the first noise signal NS1 to be similar to the magnitude of the touch signal RS received in the second section SS2. The first-2 sampling section ST1-2 may be less than the second section SS2.

In various embodiments, the first-3 sampling section ST1-3 may be synchronized with the third section SS3. The first RC circuit RC1 may control a magnitude of the first noise signal NS1 in the first-3 sampling section ST1-3 corresponding to the third section SS3 during the sensing frame SFR. The first RC circuit RC1 may control a magnitude of the first noise signal NS1 to be similar to the magnitude of the touch signal RS received in the third section SS3. The first-3 sampling section ST1-3 may be less than the third section SS3.

Because the first RC circuit RC1 can control the magnitude of the first noise signal NS1, the first noise signal NS1 may have a plurality of noise values respectively corresponding to a plurality of channels CH.

Referring to FIGS. 5, 6B, and 11, the sensor layer 200, a first-2 RC circuit RC1-2, and the sensor driving part 200C may be driven in a unit of a sensing frame SFR.

In various embodiments, the third section SS3 may include a third-1 section SS3-1, a third-2 section SS3-2, and a third-3 section SS3-3. A signal corresponding to the first area AR1 may be received in the third-1 section SS3-1. A signal corresponding to the second area AR2 may be received in the third-2 section SS3-2. A signal corresponding to the third area AR3 may be received in the third-3 section SS3-3.

In various embodiments, the first RC circuit RC1-1 may control a magnitude of the first noise signal NS1 in the second-1 sampling section ST2-1 corresponding to the third-1 section SS3-1 during the sensing frame (SFR). Here, the first RC circuit RC1-1 may control the magnitude of the first noise signal NS1 to be similar to the magnitude of the touch signal RS received in the first area AR1 of the third section SS3.

In various embodiments, the first RC circuit RC1-1 may control a magnitude of the first noise signal NS1 in the second-2 sampling section ST2-2 corresponding to the third-2 section SS3-2 during the sensing frame SFR. The first RC circuit RC1-1 may control a magnitude of the first noise signal NS1 to be similar to the magnitude of the touch signal RS received in the second area AR2 of the third section SS3.

In various embodiments, the first RC circuit RC1-1 may control a magnitude of the first noise signal NS1 in the second-3 sampling section ST2-3 corresponding to the third-3 section SS3-3 during the sensing frame SFR. The first RC circuit RC1-1 may control the magnitude of the first noise signal NS1 to be similar to the magnitude of the touch signal RS received in the third area AR3 of the third section SS3.

Because the first RC circuit RC1-1 controls the magnitude of the first noise signal NS1, the first noise signal NS1 may have a plurality of noise values respectively corresponding to a plurality of channels CH.

In FIG. 11, although only the operation of the first RC circuit RC1-1 in the third section SS3 is illustrated, the first RC circuit RC1-1 may equally operate in the first section SS1 and SS2.

FIGS. 12A to 12F are views for explaining a digital touch signal, a digital noise signal, and a reduction signal according to an embodiment of the inventive concept.

Referring to FIGS. 7, 10A, 11, and 12A to 12F, the first noise signal NS1 may include a plurality of noise values corresponding to the plurality of channels CH (see FIG. 5). The converter 200C2 may convert an input analog signal into a digital signal. The converter 200C2 may digital-convert the plurality of noise values into digital noise signals DNS1-1, DNS1-2, DNS1-3, and DNS1-4.

In various embodiments, the signal processor 200C3 may receive the digital touch signal DRS and the digital noise signals DNS1-1, DNS1-2, DNS1-3, and DNS1-4 to calculate reduction signals FSa and FSb.

In various embodiments, the digital noise signals DNS1-1, DNS1-2, DNS1-3, and DNS1-4 may include a first digital noise signal DNS1-1, a second digital noise signal DNS1-2, a third digital noise signal DNS1-3, and a fourth digital noise signal DNS1-4.

In various embodiments, the digital touch group DRG may include a digital touch signal DRS corresponding to each of the plurality of channels CH (see FIG. 5). Reference symbols R1 to R7 may indicate seven second sensing electrodes of the plurality of first sensing electrodes TE1, and reference symbols T1 to T5 may indicate five second sensing electrodes of the plurality of second sensing electrodes TE2. Although reference symbols 12a to 12f indicate only 35 channels CH (see FIG. 5), the number of channels CH (see FIG. 5) according to an embodiment of the inventive concept is not limited thereto.

In various embodiments, the digital touch signal DRS may be a signal obtained by converting the plurality of analog touch signals RS corresponding to the plurality of channels CH (see FIG. 5) into digital signals, where the digital touch signal DRS may be a digital signal generated from the analog touch signal RS. The digital touch signal DRS may have a predetermined signal-to-noise ratio (SNR), where for example, the signal-to-noise ratio (SNR) of the digital touch signal DRS may be about 20 dB.

FIG. 12A illustrates a case in which a touch by the user's body 2000 (see FIG. 2) is applied to coordinates corresponding to T3 and R4, as an example. Here, the digital touch signal DRS may have a value of about 111, which may be greater than the values detected at surrounding coordinates. The digital touch signal DRS may have a lower value as a distance from the coordinates corresponding to T3 and R4 increases.

In various embodiments, a first digital noise group DNG1-1 may correspond to a digital touch group DRG. The first digital noise group DNG1-1 may include a first digital noise signal DNS1-1 obtained by averaging digital noise signals, which are respectively correspond to the plurality of channels CH (see FIG. 5). The sensor driving part 200C may digital-convert the plurality of noise values into the digital noise signal DNS1-1, DNS1-2, DNS1-3, and DNS1-4.

In various embodiments, the sensor driving part 200C may subtract the digital touch signal DRS and the first digital noise signal DNS1-1, where the sensor driving part 200C may subtract the average value DNS1-1 of the plurality of digital noise signals from the digital touch signal DRS of the touch signal RS. As a result, the sensor driving part 200C may output reduction signals FSa and FSb in which at least a portion of the noise is removed from the touch signal RS.

In the reduction signal group FSG corresponding to the digital touch group DRG, the reduction signals FSa and FSb may include a first reduction signal FSa and a second reduction signal FSb. The first reduction signal FSa may be a signal measured at a portion to which the touch is applied, and the first reduction signal FSa may correspond to the digital touch signal DRS having coordinates corresponding to T3 and R4. The second reduction signal FSb may be defined as a signal measured at a location where a touch has not been applied. The portion corresponding to the second reduction signal FSb in the digital touch group DRG may be measured as about 12, but the second reduction signal FSb in the reduction signal group FSG may be measured as about 0. That is, it is seen that the signal corresponding to the noise is removed from the reduction signal group FSG.

In various embodiments, each of the reduction signals FSa and FSb may have a signal-to-noise ratio (SNR) greater than that of the digital touch signal DRS, where for example, the signal-to-noise ratio (SNR) of the digital touch signal DRS may be about 40 dB. Therefore, the electronic device 1000 (see FIG. 1) having improved sensing reliability may be provided.

In various embodiments, a first digital noise group DNG1-2 may correspond to a digital touch group DRG. The second digital noise group DNG1-2 may include a second digital noise signal DNS1-2 obtained by averaging the digital noise signals arranged in the second direction DR2 among the digital noise signals, which correspond to the plurality of channels CH (see FIG. 5), respectively. The sensor driving part 200C may digital-convert the plurality of noise values into the digital noise signal DNS1-2.

In various embodiments, the sensor driving part 200C may subtract the digital touch signal DRS and the second digital noise signal DNS1-2, where the sensor driving part 200C may subtract an average value of noise values arranged in the second direction DR2 among the plurality of noise values from the touch signal RS. As a result, the sensor driving part 200C may output reduction signals FSa and FSb in which noise is at least partially removed from the touch signal RS.

In various embodiments, a third digital noise group DNG1-3 may correspond to a digital touch group DRG. The third digital noise group DNG1-3 may include a third digital noise signal DNS1-3 obtained by averaging the digital noise signals arranged in the first direction DR1 among the digital noise signals, which correspond to the plurality of channels CH (see FIG. 5), respectively. The sensor driving part 200C may digital-convert the plurality of noise values into the digital noise signal DNS1-3.

In various embodiments, the sensor driving part 200C may subtract the third digital noise signal DNS1-3 from the digital touch signal DRS. The sensor driving part 200C may subtract an average value of noise values arranged in the first direction DR1 among the plurality of noise values from the touch signal RS. As a result, the sensor driving part 200C may output reduction signals FSa and FSb in which noise is removed from the touch signal RS.

In various embodiments, the fourth digital noise group DNG1-4 may correspond to the digital touch group DRG. The fourth digital noise group DNG1-4 may include a fourth digital noise signal DNS1-4 corresponding to each of the plurality of channels CH (see FIG. 5). The sensor driving part 200C may digital-convert the plurality of noise values into the digital noise signal DNS1-4.

In various embodiments, the sensor driving part 200C may subtract the digital touch signal DRS and the fourth digital noise signal DNS1-4. That is, the sensor driving part 200C may subtract the plurality of digital noise signals DNS1-4 from the digital touch signal DRS of the touch signal RS. As a result, the sensor driving part 200C may output reduction signals FSa and FSb in which noise is removed from the touch signal RS.

In various embodiments, the data signal DATA (see FIG. 9) may cause an interference to the touch signal RS through the interference capacitor CC (see FIG. 9). A portion of the data signal DATA (see FIG. 9) may affect the interpretation of the touch signal RS; however, the sensor driving part 200C may obtain the reduction signal FS by differentiating the touch signal RS and the first noise signal NS1. The reduction signal FS may have a signal-to-noise ratio (SNR) greater than that of the digital touch signal DRS. As a result, touch sensitivity of the electronic device 1000 (see FIG. 1) may be improved. Thus, it is possible to provide the electronic device 1000 (see FIG. 1) having the improved sensing reliability.

Figure 13:
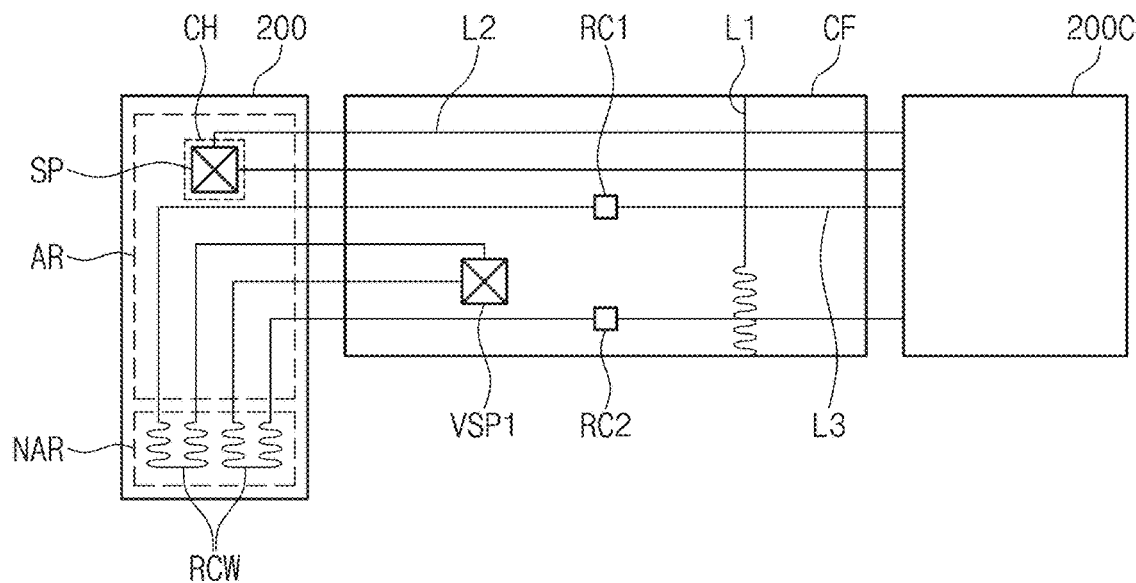
FIG. 13 is a view for explaining operations of a sensor layer, a flexible circuit board, and a sensor driving part according to an embodiment of the inventive concept.

FIG. 13 is a view for explaining operations of a sensor layer, a flexible circuit board, and a sensor driving part according to an embodiment of the inventive concept; In descriptions of FIG. 13, the same reference numerals are used for components described through FIGS. 5 and 6A, and descriptions thereof are omitted.

Referring to FIGS. 5, 6A, and 13, the electronic device 1000 (see FIG. 1) may include a sensor layer 200, a flexible circuit board CF, a sensor driving part 200C, a first virtual sensor part VSP1, a first RC circuit RC1, a second RC circuit RC2, a display signal line L1, a sensor signal line L2, a virtual sensor signal line L3, and an RC line RCW.

In various embodiments, the sensor layer 200 may include an active area AR and a peripheral area NAR. The sensor layer 200 may include a sensing electrode SP. The sensing electrode SP may be disposed on the active area AR, and the sensing electrode SP may be provided in plurality.

In various embodiments, the plurality of sensing electrodes SP may transmit the touch signal TS (FIG. 9) through the sensor signal line L2. The sensor driving part 200C may receive the touch signal TS (see FIG. 9) from the plurality of sensing electrodes SP.

In various embodiments, the first virtual sensor part VSP1 may include a plurality of virtual electrodes VM (see FIG. 7). A portion of the plurality of virtual electrodes VM (see FIG. 7) may be electrically connected to the RC line RCW and the first RC circuit RC1. The RC line RCW and the first RC circuit RC1 may be electrically connected to the sensor driving part 200C. That is, the RC line RCW and the first RC circuit RC1 may be connected between the sensor driving part 200C and the first virtual sensor part VSP1. The RC line RCW may be disposed on the peripheral area NAR of the sensor layer 200. The first RC circuit RC1 may be omitted or simplified.

In various embodiments, the other portion of the plurality of virtual electrodes VM (see FIG. 7) may be electrically connected to the RC line RCW and the second RC circuit RC2. The RC line RCW and the second RC circuit RC2 may be electrically connected to the sensor driving part 200C. That is, the RC line RCW and the second RC circuit RC2 may be connected between the sensor driving part 200C and the first virtual sensor part VSP1. The second RC circuit RC2 may be omitted or simplified.

In various embodiments, the first virtual sensor part VSP1 may transmit the first noise signal NS1 (see FIG. 10A) to the sensor driving part 200C.

In various embodiments, the RC line RCW may have a meandering shape to control the magnitude of the first noise signal NS1 (see FIG. 10A). For example, the RC line RCW may control a magnitude of the first noise signal NS1 (see FIG. 10A) to be similar to that of the touch signal TS (see FIG. 9).

In various embodiments, the electronic device 1000 (see FIG. 1) may include a first virtual sensor part VSP1 disposed on the flexible circuit board CF. The sensor driving part 200C may subtract the first noise signal NS1 (FIG. 10A) received from the first virtual sensor part VSP1 and the touch signal RS received from the sensor layer 200. Thus, the sensor driving part 200C may obtain a reduction signal FS (see FIG. 10A) in which only the noise signal is subtracted. Therefore, the electronic device 1000 (see FIG. 1) having improved sensing reliability may be provided.

Figure 14:
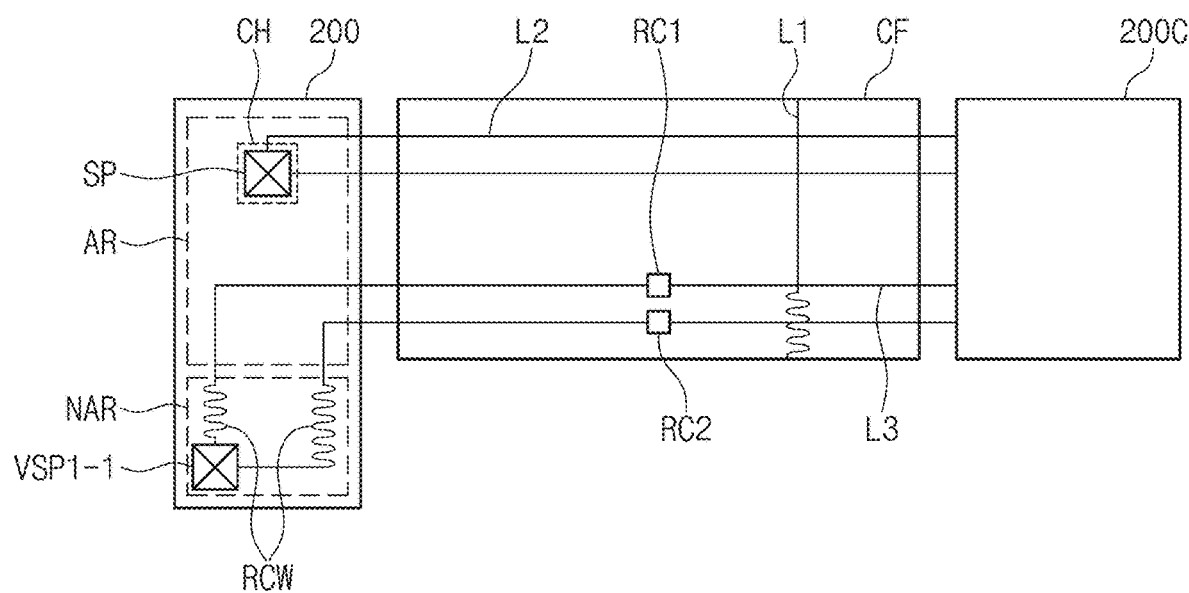
FIG. 14 is a view for explaining operations of a sensor layer, a flexible circuit board, and a sensor driving part according to an embodiment of the inventive concept.

FIG. 14 is a view for explaining operations of a sensor layer, a flexible circuit board, and a sensor driving part according to an embodiment of the inventive concept. In descriptions of FIG. 14, the same reference numerals are used for components described through FIGS. 5, 6A, and 13, and descriptions thereof are omitted.

Referring to FIGS. 5, 6A, 13, and 14, the electronic device 1000 (see FIG. 1) may include a sensor layer 200, a flexible circuit board CF, a sensor driving part 200C, a first virtual sensor part VSP1-1, a first RC circuit RC1, a second RC circuit RC2, a display signal line L1, a sensor signal line L2, a virtual sensor signal line L3, and an RC line RCW.

In various embodiments, the first virtual sensor part VSP1-1 may include a plurality of virtual electrodes VM (see FIG. 7). The first virtual sensor part VSP1-1 may be disposed in the peripheral area NAR of the sensor layer 200. When viewed in the plan view, the first virtual sensor part VSP1-1 may overlap the peripheral area NAR.

In various embodiments, the first virtual sensor part VSP1-1 may transmit the first noise signal NS1 (see FIG. 10A) to the sensor driving part 200C.

In various embodiments, the electronic device 1000 (see FIG. 1) may include a first virtual sensor part VSP1-1 disposed on the peripheral area NAR of the sensor layer 200. The sensor driving part 200C may subtract the first noise signal NS1 (FIG. 10A) received from the first virtual sensor part VSP1-1 and the touch signal RS received from the sensor layer 200. Thus, the sensor driving part 200C may obtain a reduction signal FS (see FIG. 10A) in which only the noise signal is subtracted. Therefore, the electronic device 1000 (see FIG. 1) having improved sensing reliability may be provided.

Figure 15:
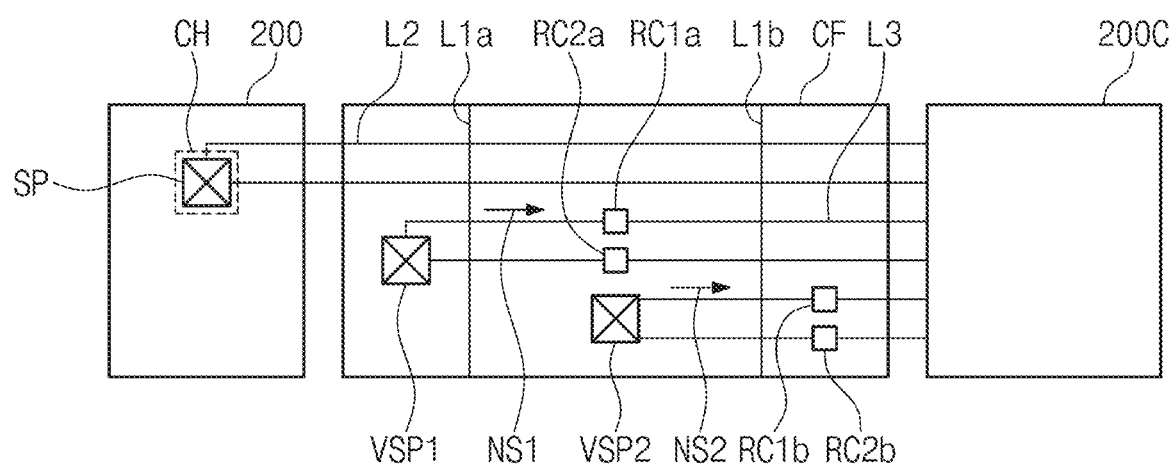
FIG. 15 is a view for explaining operations of a sensor layer, a flexible circuit board, and a sensor driving part according to an embodiment of the inventive concept.

FIG. 15 is a perspective view for explaining operations of a sensor layer, a flexible circuit board, and a sensor driving part according to an embodiment of the inventive concept. In descriptions of FIG. 15, the same reference numerals are used for components described through FIGS. 5 and 6A, and descriptions thereof are omitted.

Referring to FIGS. 5, 6A, and 15, the electronic device 1000 (see FIG. 1) may include a sensor layer 200, a flexible circuit board CF, a sensor driving part 200C, a first virtual sensor part VSP1, a second virtual sensor part VSP2, a first-a RC circuit RC1a, a second-a RC circuit RC2a, a first-b RC circuit RC1b, a second-b RC circuit RC2b, a first display signal line L1a, a second display signal line L1b, a sensor signal line L2, and a virtual sensor signal line L3.

In various embodiments, the plurality of sensing electrodes SP may transmit the touch signal TS (FIG. 9) through the sensor signal line L2. The sensor driving part 200C may receive the touch signal TS (see FIG. 9) from the plurality of sensing electrodes SP.

In various embodiments, the first display signal line L1a may be electrically connected between the display layer 100 and the controller 1000C (see FIG. 2). For example, the first display signal line L1a may be connected between the plurality of display pads P1 and P2 and the connector CNT. The first display signal line L1a may transmit and receive a data signal DATA (see FIG. 9). The first display signal line L1a may be disposed on the flexible circuit board CF.

In various embodiments, the second display signal line L1b may be electrically connected between the display layer 100 and the controller 1000C (see FIG. 2). For example, the second display signal line L1b may be connected between the plurality of display pads P1 and P2 and the connector CNT. The second display signal line Lb may transmit and receive the data signal DATA (see FIG. 9). The second display signal line L1b may be disposed on the flexible circuit board CF.

When viewed in the plan view, the sensor signal line L2 may intersect the first display signal line L1a and the second display signal line L1b, and the touch signal TS (see FIG. 9) may include noise.

In various embodiments, the first virtual sensor part VSP1 may include a plurality of virtual electrodes VM (see FIG. 7). The first virtual sensor part VSP1 may be disposed on the flexible circuit board CF.

In various embodiments, a portion of the plurality of virtual electrodes VM (see FIG. 7) may be electrically connected to the first-a RC circuit RC1a. The first-a RC circuit RC1a may be electrically connected to the sensor display driving part 200C.

In various embodiments, the other portion of the plurality of virtual electrodes VM (see FIG. 7) may be electrically connected to the second-a RC circuit RC2a. The second-a RC circuit RC2a may be electrically connected to the sensor display driving part 200C.

In various embodiments, the first virtual sensor part VSP1 may transmit the first noise signal NS1 to the sensor display driving part 200C. That is, the sensor driving part 200C may receive the first noise signal NS1 from the plurality of virtual electrodes VM (see FIG. 7).

In various embodiments, each of the first-a RC circuit RC1a and the second-a RC circuit RC2a may include a passive element.

In various embodiments, the first-a RC circuit RC1a and the second-a RC circuit RC2a may control a magnitude of the first noise signal NS1. For example, the first-a RC circuit RC1a and the second-a RC circuit RC2a may control the magnitude of the first noise signal NS1 to be similar to the magnitude of the touch signal TS (see FIG. 9).

In various embodiments, the second virtual sensor part VSP2 may include a plurality of virtual electrodes VM (see FIG. 7). The second virtual sensor part VSP2 may be disposed on the flexible circuit board CF.

In various embodiments, a portion of the plurality of virtual electrodes VM (see FIG. 7) may be electrically connected to the first-b RC circuit RC1b. The first-b RC circuit RC1b may be electrically connected to the sensor display driving part 200C.

In various embodiments, the other portion of the plurality of virtual electrodes VM (see FIG. 7) may be electrically connected to the second-b RC circuit RC2b. The second-b RC circuit RC2b may be electrically connected to the sensor display driving part 200C.

In various embodiments, the second virtual sensor part VSP2 may transmit the second noise signal NS2 to the sensor display driving part 200C. That is, the sensor display driving part 200C may receive the second noise signal NS2 from the plurality of virtual electrodes VM (see FIG. 7).

In various embodiments, each of the first-b RC circuit RC1b and the second-b RC circuit RC2b may include a passive element.

In various embodiments, the first-b RC circuit RC1b and the second-b RC circuit RC2b may control a magnitude of the first noise signal NS1. For example, the first-b RC circuit RC1b and the second-b RC circuit RC2b may control the magnitude of the second noise signal NS2 to be similar to the magnitude of the touch signal TS (see FIG. 9).

In various embodiments, the sensor display driving part 200C may subtract the first noise signal NS1 and the second noise signal NS2 from the touch signal RS (see FIG. 9).

In various embodiments, the electronic device 1000 (see FIG. 1) may include a first virtual sensor part VSP1 and a second virtual sensor part VSP2 disposed on the flexible circuit board CF. The sensor display driving part 200C may subtract the first noise signal NS1 received from the first virtual sensor unit VSP1 and the second noise signal NS2 received from the second virtual sensor unit VSP2 from the touch signal RS received from the sensor layer 200. Thus, the sensor driving part 200C may obtain a reduction signal FS (see FIG. 10A) in which only the noise signal is subtracted. Therefore, the electronic device 1000 (see FIG. 1) having improved sensing reliability may be provided.

As described above, the sensor driving part may subtract the noise signal and the touch signal, which are measured using the virtual sensor part, from each other. Therefore, the sensor driving part may obtain the signal obtained by differentiating only the noise signal. Therefore, the electronic device having the improved sensing reliability may be provided.

It will be apparent to those skilled in the art that various modifications and deviations can be made in the inventive concept. Thus, it is intended that the inventive concept covers the modifications and deviations of this invention provided they come within the scope of the appended claims and their equivalents. Accordingly, the technical scope of the inventive concept should not be limited to the contents described in the detailed description of the specification, but should be determined by the claims.

What is claimed is:

1. An electronic device comprising:
a display layer;
a sensor layer disposed on the display layer and comprising a plurality of sensing electrodes;
a sensor driving part configured to drive the sensor layer;
a first virtual sensor part comprising a plurality of virtual electrodes disposed on layers different from each other, wherein a capacitor is disposed between nearest pairs of the plurality of virtual electrodes;
a first RC circuit electrically connected between the sensor driving part and the first virtual sensor part; and
a flexible circuit board which is connected to the display layer and on which the sensor driving part and the first RC circuit are disposed,
wherein the sensor driving part is configured to receive a touch signal from the plurality of sensing electrodes and receive a first noise signal from the plurality of virtual electrodes,
the first RC circuit is configured to control a magnitude of the first noise signal, and
the sensor driving part is configured to subtract the touch signal and the first noise signal.

2. The electronic device of claim 1, wherein the plurality of virtual electrodes comprise a first virtual electrode and a second virtual electrode, wherein the first virtual electrode and the second virtual electrode are disposed on the layers that are different from each other, and
the first virtual electrode and the second virtual electrode are disposed on the flexible circuit board.

3. The electronic device of claim 1, further comprising a second RC circuit electrically connected between the sensor driving part and the first virtual sensor part.

4. The electronic device of claim 3, wherein each of the first RC circuit and the second RC circuit comprises a passive element.

5. The electronic device of claim 3, wherein each of the first RC circuit and the second RC circuit comprises an active element, and the electronic device further comprises a circuit controller configured to control the first RC circuit and the second RC circuit, wherein the circuit controller is disposed on the flexible circuit board.

6. The electronic device of claim 1, wherein the sensor driving part comprises a signal receiver comprising a first input terminal and a second input terminal, wherein the touch signal is applied to the first input terminal of the signal receiver, and
the first noise signal is applied to the second input terminal of the signal receiver.

7. The electronic device of claim 1, wherein the sensor driving part comprises a first signal receiver and a second signal receiver, wherein the first signal receiver and the second signal receiver each comprise a first input terminal and a second input terminal, respectively, wherein the touch signal is applied to the first input terminal of the first signal receiver, and
the first noise signal is applied to the first input terminal of the second signal receiver.

8. The electronic device of claim 1, wherein the plurality of sensing electrodes comprise a plurality of first sensing electrodes and a plurality of second sensing electrodes, which are insulated from and intersect the plurality of first sensing electrodes, each of the plurality of first sensing electrodes extends in a first direction,
each of the plurality of second sensing electrodes extends in a second direction intersecting the first direction,
the plurality of first sensing electrodes and the plurality of second sensing electrodes are configured to define a plurality of channels, respectively,
the first noise signal comprises a plurality of noise values, which correspond to the plurality of channels, respectively, and
the sensor driving part is configured to digital-convert the plurality of noise values into a plurality of digital noise signals, respectively.

9. The electronic device of claim 8, wherein the sensor driving part is configured to subtract a mean value of the plurality of digital noise signals from a digital signal of the touch signal.

10. The electronic device of claim 9, wherein the sensor driving part is configured to subtract a mean value of digital noise signals arranged in the first direction among the plurality of digital noise signals from the digital signal of the touch signal.

11. The electronic device of claim 9, wherein the sensor driving part is configured to subtract a mean value of digital noise signals arranged in the second direction among the plurality of digital noise signals from the digital signal of the touch signal.

12. The electronic device of claim 8, wherein the touch signal is provided in plurality,
   the plurality of touch signals correspond to the plurality of channels, respectively,
   the sensor driving part is configured to subtract the plurality of digital noise signals from a plurality of digital signals of the plurality of touch signals, respectively.

13. An electronic device comprising:
   a display layer;
   a sensor layer disposed on the display layer and comprising a plurality of sensing electrodes;
   a sensor driving part configured to drive the sensor layer;
   a first virtual sensor part comprising a plurality of virtual electrodes disposed on layers different from each other, wherein a capacitor is disposed between nearest pairs of the plurality of virtual electrodes;
   a first RC circuit electrically connected between the sensor driving part and the first virtual sensor part; and
   a flexible circuit board which is connected to the display layer and on which the sensor driving part and the first RC circuit are disposed,
   wherein the sensor driving part is configured to receive a touch signal from the plurality of sensing electrodes and receive a first noise signal from the plurality of virtual electrodes,
   wherein the first RC circuit is configured to control a magnitude of the first noise signal,
   wherein the sensor driving part is configured to subtract the touch signal and the first noise signal,
   wherein the sensor layer comprises an active area and a peripheral area disposed around the active area,
   wherein the sensor layer is driven in a unit of a sensing frame,
   wherein the sensing frame comprises a first section, a second section, and a third section, and
   wherein the sensor driving part is configured to receive the touch signal in a self-touch method in each of the first section and the second section and receive the touch signal in a mutual touch method in the third section.

14. The electronic device of claim 13, wherein the first RC circuit is configured to operate in the unit of the sensing frame and comprises a passive element,
   the first RC circuit is configured to control a magnitude of the first noise signal in a first-1 sampling section corresponding to the first section during the sensing frame,
   the first RC circuit is configured to control a magnitude the first noise signal in a first-2 sampling section corresponding to the second section during the sensing frame, and
   the first RC circuit is configured to control a magnitude the first noise signal in a first-3 sampling section corresponding to the third section during the sensing frame.

15. The electronic device of claim 14, wherein the first-1 sampling section is less than the first section,
   the first-2 sampling section is less than the second section, and
   the first-3 sampling section is less than the third section.

16. The electronic device of claim 13, wherein the active area comprises a first area, a second area, and a third area, which are arranged in a second direction,
   the third section comprises a third-1 section, in which a signal corresponding to the first area is received, a third-2 section, in which a signal corresponding to the second area is received, and a third-3 section, in which a signal corresponding to the third area is received,
   the first RC circuit is configured to operate in the unit of the sensing frame and comprises an active element,
   the first RC circuit is configured to control a magnitude of the first noise signal in a second-1 sampling section corresponding to the third-1 section during the sensing frame,
   the first RC circuit is configured to control a magnitude the first noise signal in a second-2 sampling section corresponding to the third-2 section during the sensing frame, and
   the first RC circuit is configured to control a magnitude the first noise signal in a second-3 sampling section corresponding to the third-3 section during the sensing frame.

17. The electronic device of claim 13, further comprising a second virtual sensor part disposed on the flexible circuit board,
   wherein the sensor driving part is configured to receive a second noise signal from the second virtual sensor part, and
   the sensor driving part is configured to subtract the first noise signal and the second noise signal from the touch signal.

18. An electronic device comprising:
   a display layer;
   a sensor layer disposed on the display layer and comprising a plurality of sensing electrodes;
   a sensor driving part configured to drive the sensor layer;
   a first virtual sensor part comprising a plurality of virtual electrodes disposed on layers different from each other, wherein a capacitor is disposed between nearest pairs of the plurality of virtual electrodes;
   a first RC circuit electrically connected between the sensor driving part and the first virtual sensor part; and
   a flexible circuit board which is connected to the display layer and on which the sensor driving part and the first RC circuit are disposed,
   wherein the sensor driving part is configured to receive a touch signal from the plurality of sensing electrodes and receive a first noise signal from the plurality of virtual electrodes,
   wherein the first RC circuit is configured to control a magnitude of the first noise signal,
   wherein the sensor driving part is configured to subtract the touch signal and the first noise signal,
   wherein the sensor layer comprises an active area and a peripheral area disposed around the active area, and
   wherein the first virtual sensor part is disposed on the peripheral area.

19. The electronic device of claim 18, further comprising an RC line configured to control a magnitude of the first noise signal and disposed on the sensor layer,
   wherein the RC line is connected between the sensor driving part and the first virtual sensor part.

20. The electronic device of claim 19, wherein the sensor layer comprises an active area and a peripheral area disposed around the active area, and
   the RC line is disposed on the peripheral area.

* * * * *